(12) United States Patent
Nagashima et al.

(10) Patent No.: US 7,185,978 B2
(45) Date of Patent: *Mar. 6, 2007

(54) RECORDING METHOD, INK CARTRIDGE, PRINTING DEVICE AND INFORMATION RECORDING APPARATUS

(75) Inventors: Akira Nagashima, Tokyo (JP); Shoji Koike, Kanagawa (JP); Shinichi Hakamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/634,825

(22) Filed: Aug. 6, 2003

(65) Prior Publication Data

US 2004/0027404 A1 Feb. 12, 2004

Related U.S. Application Data

(62) Division of application No. 10/021,091, filed on Dec. 19, 2001, now Pat. No. 6,676,254.

(30) Foreign Application Priority Data

Dec. 21, 2000 (JP) ............................. 2000-388531
Jul. 31, 2001 (JP) ............................. 2001-231041

(51) Int. Cl.
G01D 11/00 (2006.01)

(52) U.S. Cl. .................. 347/100; 347/101; 347/96

(58) Field of Classification Search ................ 347/100, 347/96, 101, 95, 86, 84, 85; 106/31.13, 31.27, 106/31.6; 523/160

See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,557,761 A | 12/1985 | Kobayashi et al. | 106/22 |
| 4,558,333 A | 12/1985 | Sugitani et al. | 346/140 |
| 4,608,577 A | 8/1986 | Hori et al. | 346/140 |
| 4,632,703 A | 12/1986 | Koike et al. | 106/22 |
| 4,689,078 A | 8/1987 | Koike et al. | 106/22 |
| 4,723,129 A | 2/1988 | Endo et al. | 346/1.1 |
| 4,740,796 A | 4/1988 | Endo et al. | 346/1.1 |
| 4,838,938 A | 6/1989 | Tomida et al. | 106/22 |
| 4,849,770 A | 7/1989 | Koike et al. | 346/1.1 |

(Continued)

FOREIGN PATENT DOCUMENTS

JP 54-56847 A 5/1979

(Continued)

*Primary Examiner*—Manish S. Shah
(74) *Attorney, Agent, or Firm*—Fitzpatrick, Cella, Harper & Scinto

(57) ABSTRACT

A recording method including the step of providing an ink from a recording head to a recording medium through a gap provided between the recording head and the recording medium, the ink being supplied to the recording head from an ink tank including an ink contact member and the ink contacting the ink contact member, wherein the ink comprises:

(i) a fluorescent coloring material;
(ii) a nonionic surfactant;
(iii) a compound which is not compatible with (ii); and
(iv) a liquid medium for dissolving or dispersing (i), (ii) and (iii), and wherein the ink contact member comprises at least one compound selected from the group consisting of polyacetate and polyolefin.

48 Claims, 15 Drawing Sheets

U.S. PATENT DOCUMENTS

| | | | |
|---|---|---|---|
| 4,853,036 A | 8/1989 | Koike et al. | 106/20 |
| 4,923,515 A | 5/1990 | Koike et al. | 106/22 |
| 4,957,553 A | 9/1990 | Koike et al. | 106/20 |
| 4,965,612 A | 10/1990 | Sakaki et al. | 346/1.1 |
| 4,969,951 A | 11/1990 | Koike et al. | 106/22 |
| 5,017,227 A | 5/1991 | Koike et al. | 106/22 |
| 5,053,078 A | 10/1991 | Koike et al. | 106/22 |
| 5,067,980 A | 11/1991 | Koike et al. | 106/22 |
| 5,075,699 A | 12/1991 | Koike et al. | 346/1.1 |
| 5,099,255 A | 3/1992 | Koike et al. | 346/1.1 |
| 5,101,217 A * | 3/1992 | Iwata et al. | 347/100 |
| 5,118,351 A | 6/1992 | Shirota et al. | 106/22 |
| 5,124,718 A | 6/1992 | Koike et al. | 346/1.1 |
| 5,213,613 A | 5/1993 | Nagashima et al. | 106/20 |
| 5,218,376 A | 6/1993 | Asai | 346/1.1 |
| 5,254,157 A | 10/1993 | Koike et al. | 106/20 |
| 5,258,066 A | 11/1993 | Kobayashi et al. | 106/22 |
| 5,296,022 A | 3/1994 | Kobayashi et al. | 106/20 |
| 5,358,558 A | 10/1994 | Yamamoto et al. | 106/22 |
| 5,396,275 A | 3/1995 | Koike et al. | 347/101 |
| 5,409,529 A | 4/1995 | Nagashima et al. | 106/22 |
| 5,451,251 A | 9/1995 | Mafune et al. | 106/22 |
| 5,478,383 A | 12/1995 | Nagashima et al. | 106/22 |
| 5,482,545 A | 1/1996 | Aoki et al. | 106/22 |
| 5,485,188 A | 1/1996 | Tochihara et al. | 347/100 |
| 5,500,023 A | 3/1996 | Koike et al. | 8/499 |
| 5,515,093 A | 5/1996 | Haruta et al. | 347/101 |
| 5,570,120 A * | 10/1996 | Sakaki et al. | 347/105 |
| 5,571,313 A | 11/1996 | Mafune et al. | 106/22 |
| 5,637,140 A | 6/1997 | Fujioka et al. | 106/31.35 |
| 5,658,376 A | 8/1997 | Noguchi et al. | 106/31.43 |
| 5,681,381 A * | 10/1997 | Auslander et al. | 347/100 |
| 5,686,951 A | 11/1997 | Koike et al. | 347/106 |
| 5,718,793 A | 2/1998 | Inamoto et al. | 156/235 |
| 5,733,363 A | 3/1998 | Nagashima et al. | 106/31.43 |
| 5,743,945 A | 4/1998 | Yamashita et al. | 106/31.58 |
| 5,764,261 A | 6/1998 | Koike et al. | 347/100 |
| 5,769,930 A | 6/1998 | Sano et al. | 106/31.36 |
| 5,795,375 A | 8/1998 | Yamazaki et al. | 106/31.57 |
| 5,852,074 A | 12/1998 | Tsutumi et al. | 523/161 |
| 5,861,056 A | 1/1999 | Yamazaki et al. | 106/31.27 |
| 5,865,883 A * | 2/1999 | Teraoka et al. | 106/31.32 |
| 5,871,572 A | 2/1999 | Marritt et al. | 106/31.36 |
| 5,902,387 A | 5/1999 | Suzuki et al. | 106/22 |
| 5,932,139 A | 8/1999 | Oshima et al. | 252/301.16 |
| 5,938,829 A | 8/1999 | Higashiyama et al. | 106/31.58 |
| 5,953,031 A * | 9/1999 | Omata et al. | 347/86 |
| 6,036,307 A | 3/2000 | Hakamada et al. | 347/106 |
| 6,051,057 A | 4/2000 | Yatake et al. | 106/31.58 |
| 6,084,619 A * | 7/2000 | Takemoto et al. | 347/100 |
| 6,169,185 B1 * | 1/2001 | Likavec et al. | 548/305.1 |
| 6,214,963 B1 | 4/2001 | Noguchi et al. | 528/71 |
| 6,302,530 B1 * | 10/2001 | Shimada et al. | 347/86 |
| 6,322,209 B1 | 11/2001 | Sato et al. | 347/105 |
| 6,398,355 B1 | 6/2002 | Shirota et al. | 347/100 |
| 6,426,766 B1 | 7/2002 | Shirota et al. | 347/106 |
| 6,474,803 B1 | 11/2002 | Shirota et al. | 347/100 |
| 6,676,254 B2 * | 1/2004 | Nagashima et al. | 347/100 |
| 6,676,734 B2 * | 1/2004 | Nagashima et al. | 106/31.32 |
| 2002/0109765 A1 | 8/2002 | Sato et al. | 347/100 |

FOREIGN PATENT DOCUMENTS

| | | |
|---|---|---|
| JP | 59-123670 A | 7/1984 |
| JP | 59-138461 A | 8/1984 |
| JP | 60-71260 A | 4/1985 |
| JP | 2-33038 A | 2/1990 |
| JP | 5-293976 A | 11/1993 |
| JP | 6-191143 A | 7/1994 |
| JP | 6-322307 A | 11/1994 |
| JP | 7-9755 A | 1/1995 |
| JP | 7-51687 A | 2/1995 |
| JP | 7-305013 A | 11/1995 |
| JP | 8-53639 A | 2/1996 |
| JP | 8-151545 A | 6/1996 |
| JP | 9-1294 A | 1/1997 |
| JP | 9-3375 A | 1/1997 |
| JP | 9-132729 A | 5/1997 |
| JP | 9-137097 A | 5/1997 |
| JP | 9-137098 A | 5/1997 |
| JP | 9-137099 A | 5/1997 |
| JP | 9-165539 A | 6/1997 |
| JP | 9-241565 A | 9/1997 |
| JP | 9-255904 A | 9/1997 |
| JP | 9-286939 A | 11/1997 |
| JP | 10-7962 A | 1/1998 |
| JP | 2783647 | 5/1998 |
| JP | 10-183043 A | 7/1998 |
| JP | 10-193775 A | 7/1998 |
| JP | 10-298462 A | 11/1998 |
| JP | 10-298467 A | 11/1998 |
| JP | 2833038 | 12/1998 |
| JP | 11-80639 A | 3/1999 |
| JP | 2995853 B2 | 10/1999 |
| JP | 11-320921 A | 11/1999 |
| JP | 2000-38529 A | 2/2000 |

* cited by examiner

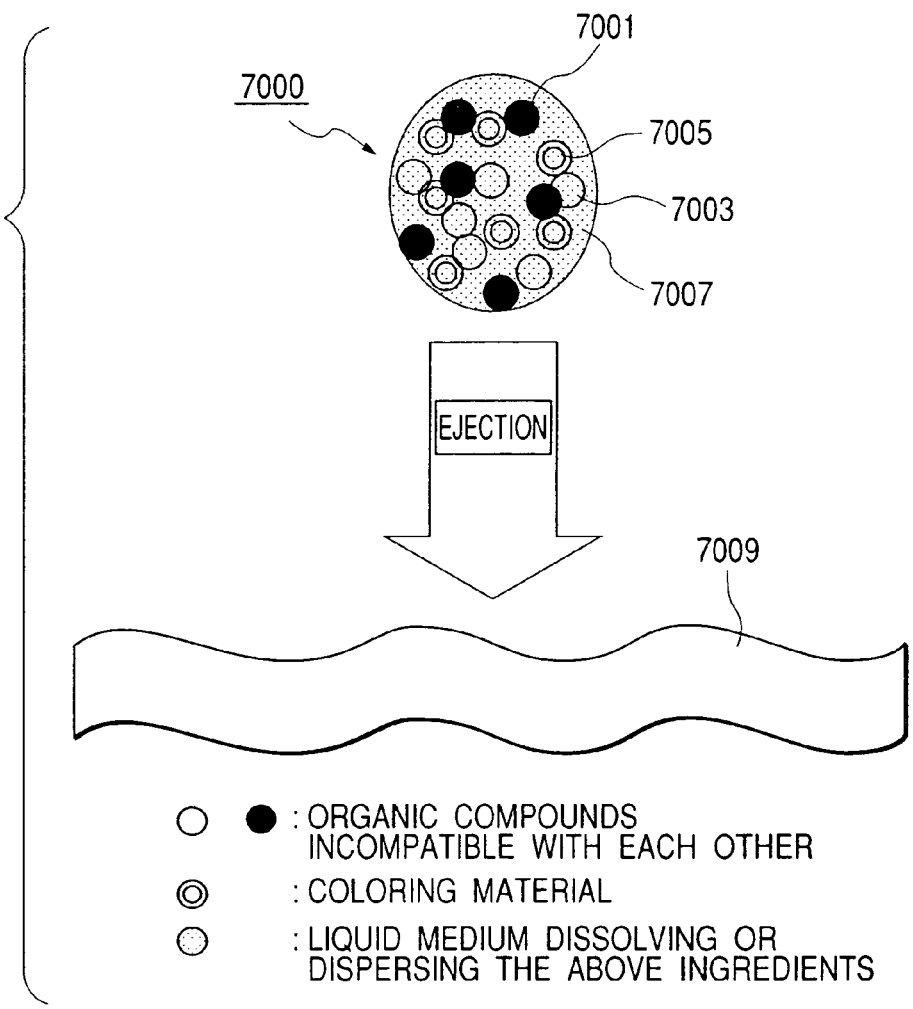
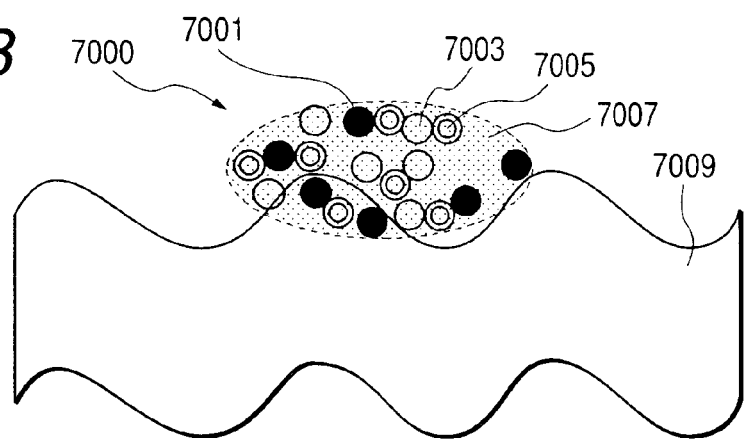

AFTER 1 μS

AFTER 4μS

AFTER 5μS

AFTER 7μS

AFTER 6μS

RECORDING METHOD, INK CARTRIDGE, PRINTING DEVICE AND INFORMATION RECORDING APPARATUS

This is a divisional application of application Ser. No. 10/021,091, filed Dec. 19, 2001 now U.S. Pat. No. 6,676,254.

BACKGROUND OF THE INVENTION

1. Field of the Invention

The present invention relates to a recording method, and more particularly, to an improved recording method for providing a recorded matter having excellent fluorescence intensity of a recorded matter even after the ink was stored for a long time with high reliability in image formation. The present invention also relates to an ink cartridge suitable to be used to stably form a recorded matter having fluorescence, to a printing device capable of producing with high reliability a printed article having fluorescence, and to an information recording apparatus capable of stably recording information to fluoresce on a recorded medium.

2. Related Art

There have been various studies and reports on inks for pens or other writing utensils and inks for ink-jet recording. Particularly, with regard to improvement of print quality including fluorescence intensity and coloring properties of recorded matters, various proposals have been made for, for example, coloring materials of a novel structure suitable for respective use, an ink containing a coloring material having fluorescence properties (hereinafter referred to as "fluorescent coloring material") as a main coloring material, and an ink containing a fluorescent coloring material as one of the coloring materials of the ink. Particularly, the proposals of inks as a result of paying attention to the fluorescence properties of fluorescent coloring materials have been described in prior art including Japanese Patent Application Laid-Open Nos. 8-151545, 9-132729, 10-193775, 10-298462 and 10-298467 and Japanese Patent No. 2833038, and novel recording processes and/or fluorescent coloring materials have been proposed therein.

In addition to the above, the proposals of uses of fluorescent coloring materials have been presented in related art including Japanese Patent Application Laid-Open Nos. 5-293976, 6-191143, 6-322307, 7-009755, 7-305013, 8-053639, 9-003375, 9-001294, 9-137097, 9-137098, 9-137099, 9-165539, 9-241565, 9-255904, 9-286939, 10-007962, 10-183043, 11-080639, 11-320921 and 2000-038529, and Japanese Patent No. 2995853.

In recent years, the application of fluorescent coloring materials is not limited to the formation of beautiful color images. For example, a technical development has been proposed in which information (security information etc.) other than visual information is imparted by printing information such as characters, numerals, marks and/or bar codes on a recording medium with an ink having fluorescence properties, and by detecting the fluorescence emitted by the ink under irradiation of ultraviolet light of a desired wavelength. Accordingly, use of inks with fluorescence properties will expand to various application fields and development of inks being stable, reliable with excellent fluorescence intensity and coloring properties is much expected.

SUMMARY OF THE INVENTION

The coloring properties of ink on a recording medium, however, have been considered only in view of chromaticity ($L^*$, $a^*$, $b^*$), i.e., a conventional measure for color. Even when a fluorescent coloring material is used, ink is designed in view of such a conventional measure, and the fluorescence developing ability of a fluorescent coloring material is far from being fully utilized at the present state. In other words, even in the above described proposals on utilization of fluorescent coloring materials, the fluorescent coloring materials are used only in view of the chromaticity ($L^*$, $a^*$, $b^*$) not in view of fluorescence properties thereof, or they are used for their fluorescence but without taking notice of the fluorescence developing properties thereof, i.e., the fluorescence properties at an interface of the recorded matter. Thus, these proposals do not fully utilize the fluorescent properties of fluorescent coloring materials.

Accordingly, an object of the present invention is to provide an ink-jet recording method which can provide a recorded matter of which recorded part is imparted with fluorescence which is important for colors in nature by fully utilizing the fluorescence properties of a fluorescent coloring material; according to this method, high fluorescence intensity, high print quality including coloring ability, high reliability including long shelf life and ejection properties of ink are obtained, and as a result, stability and reliability of a recorded matter are improved.

Another object of the present invention is to provide an ink cartridge useable in stable formation of a recorded matter that can fluoresce.

A still further object of the present invention is to provide a printing device stably producing a recorded matter that can fluoresce.

A yet still further object of the present invention is to provide an information recording apparatus stably imparting fluorescent information to a recorded matter.

Such objects can be achieved by the present invention as described below.

According to one aspect of the present invention, there is provided a recording method which comprises a step of providing an ink from a recording head to a recording medium through a gap provided between the recording head and the recording medium, the ink being supplied to the recording head from an ink tank that comprises an ink contact member and the ink contacting the ink contact member, wherein the ink comprises
(i) a fluorescent coloring material;
(ii) a nonionic surfactant;
(iii) a compound which is not compatible to (ii); and
(iv) a liquid medium for dissolving or dispersing (i), (ii) and (iii),
and wherein the ink contact member comprises at least one compound selected from the group consisting of polyacetate and polyolefin.

According to another aspect of the present invention, there is provided an ink-cartridge which comprises an aqueous ink and an ink contact member, wherein the ink comprises:
(i) a fluorescent coloring material;
(ii) a nonionic surfactant;
(iii) a compound which is not compatible with (ii); and
(iv) a liquid medium for dissolving or dispersing (i), (ii) and (iii),
wherein the ink contact member comprises at least one compound selected from the group consisting of polyacetate and polyolefin.

According to still another aspect of the present invention, there is provided a printing apparatus comprising the above-described ink cartridge and an ink-jet head for discharging ink and placed in the ink cartridge.

According to still further aspect of the present invention, there is provided an information recording apparatus which comprises the above-described ink-cartridge and an ink-jet head for discharging ink placed in the ink-cartridge.

BRIEF DESCRIPTION OF THE DRAWINGS

FIG. 7 illustrates the mechanism of color-fluorescence development according to the present invention.

FIG. 8 illustrates the mechanism of color-fluorescence development according to the present invention.

DESCRIPTION OF THE PREFERRED EMBODIMENTS

Figure 1:
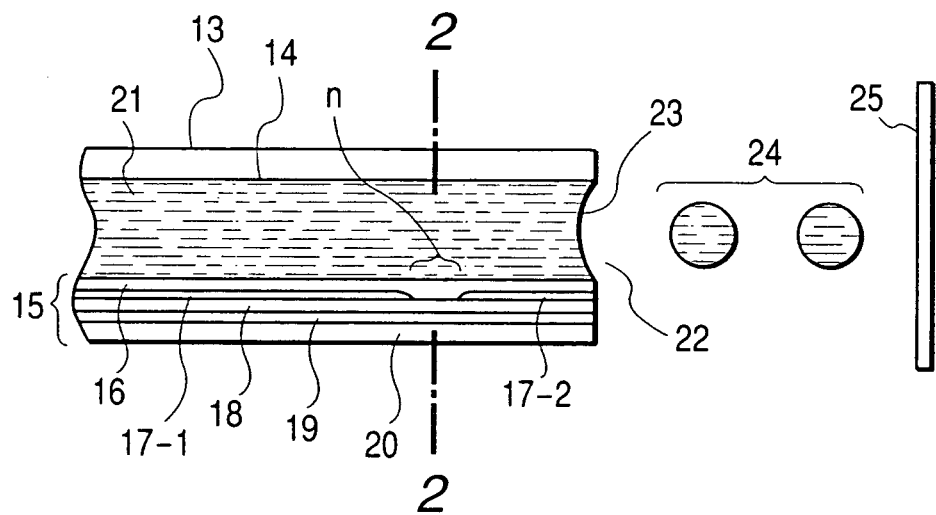
FIG. 1 is a longitudinal cross-sectional view of a head of an ink-jet recording apparatus.

The present invention is described in more detail by the preferred embodiments of the invention.

First explained is a mechanism by which an ink of the present invention can provide a recorded matter having high stability and reliability and fully sufficient coloring ability and fluorescence properties. The present inventors have considered various color development mechanisms and investigated various coloring materials and ink compositions in order to develop inks that can provide recorded matter stably and reliably with high coloring ability. As a result, the inventors have newly found that when two compounds being mutually incompatible are used as the ink components, excellent coloring can be obtained for the resulting recorded matter, thereby the present invention was accomplished.

Particularly, a water-soluble ink containing a fluorescent coloring material, a nonionic surfactant, a compound incompatible with the nonionic surfactant (hereinafter referred to as a surfactant-incompatible compound) and a liquid medium to dissolve or disperse these components can provide a recorded matter, of which print quality including fluorescence intensity or coloring are enhanced and stability and reliability are excellent, especially when the ink is applied on a recording medium by ink-jet recording. Further, the inventors have found that if an ink having such a composition is stored in an ink-holding member and/or in an ink container formed from a compound selected from the group consisting of polyacetates and polyolefins, the ink can form images of high print quality including fluorescence intensity and coloring properties even after long storage, with no problems in recording properties by the ink-jet recording process.

More particularly, for an ink-jet ink, the ejection stability and storage stability of the ink in practical use are important technical problems closely related to the reliability of an ink-jet printer. However, such various ink properties in practical use are liable to be affected by the ink contact member that contacts and holds the ink, for instance, an ink tank and an ink-holding member in the ink tank. For example, a trace of components is eluted from the ink contact member into the ink, which may change ink properties. To solve such a technical problem, there has been proposed an ink composition not to be affected by the eluents from the ink contact member (Japanese Patent Application Laid-Open No. 7-51687). Accordingly, the compatibility between ink and an ink contact member such as the ink tank and the ink-holding member is an important technical problem.

Under such technical circumstances, it was unknown with which ink contact member the ink of the present invention that can provide a recorded matter having excellent fluorescence properties can be used. As a result of study and investigation, the inventors have found that the combination of a fluorescent ink and an ink contact member made of polyacetate or polyolefin is preferable in view of ink-jet ejection properties and ink preservability, thereby achieving the present invention.

When a mechanism by which an ink can provide a recorded matter having stability and reliability with high fluorescence intensity and coloring ability is considered, usually attention is directed to how to dissolve or disperse the coloring material uniformly and in good condition in the ink, in order to enhance fluorescence and coloring ability of the recorded matter. In other words, an ink is formulated based on the investigation on how to reduce aggregation of molecules or dispersion particles of the coloring material in the ink, or how to make them small, in other words, how to raise the absorbance of the ink and maintain it at a high level. Such an ink formulation aims at improvement of coloring and fluorescence properties of the coloring material by preventing aggregation of the molecules or particles of a coloring material in the ink applied onto a recording medium.

On the other hand, the inventors of the present invention reviewed and studied the state of the ink of a large variety of recorded matters (prints) formed by applying an ink onto a recording medium. As a result, first the inventors noted that in any recorded matter, the ink on the recording medium has two interfaces: one between the recording medium and the ink, though it may not be sharp, and the other between the ink and the atmosphere. Next, the inventors noted that when recording is conducted on, for example, wood-free paper with increased ink permeability, the apparent coloring ability of a coloring material tends to decrease, and that when recording is conducted on a back-coated film or when the recorded matter is laminated, the apparent coloring of the coloring material is improved. On the basis of the above, investigation was carried out considering how to create an interface state that enhances the coloring of the coloring material between the ink on the recording medium and the atmosphere after recording, and how to maintain the interface state, to complete the recording process of the present invention.

The present inventors consider that the ink according to this embodiment can markedly enhance the fluorescence properties and coloring ability of the resulting recorded matter by the following specific mechanism.

Figure 9:
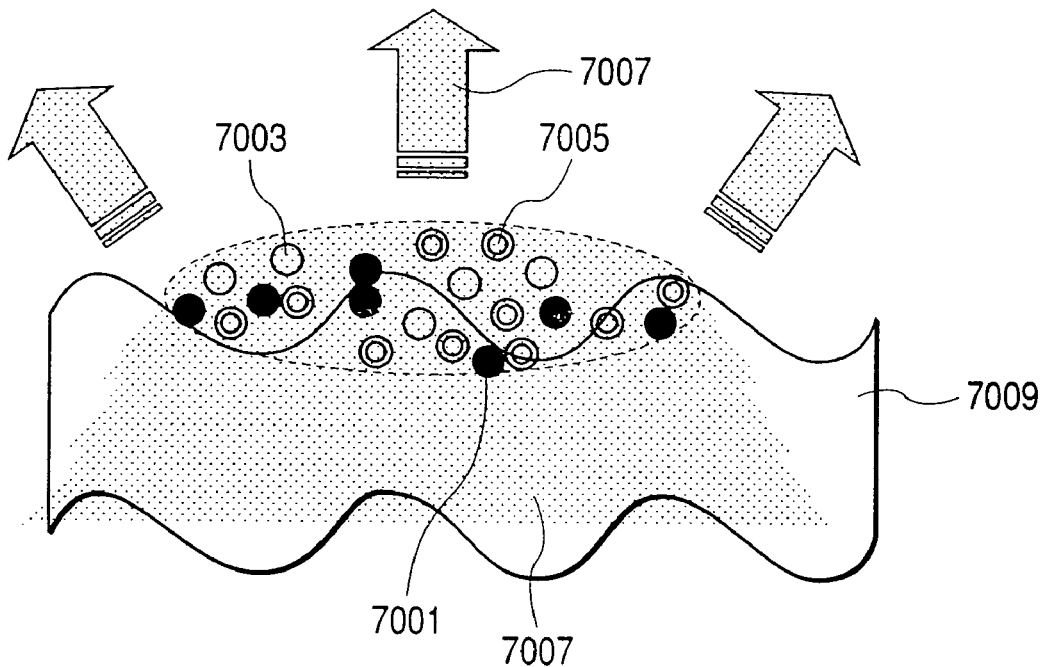
FIG. 9 illustrates the mechanism of color-fluorescence development according to the present invention.
Figure 10:
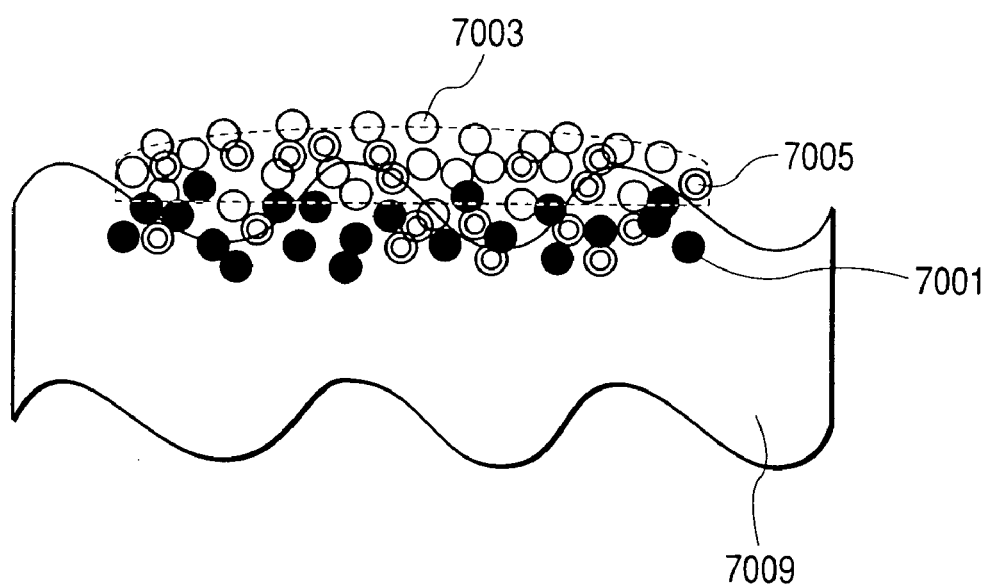
FIG. 10 illustrates the mechanism of color-fluorescence development according to the present invention.

In the ink according to the present invention, the respective components are fully dissolved or dispersed in a liquid medium in a uniform and stable state as illustrated in FIG. 7. In FIG. 7, reference numeral 7000 designates an ink droplet before landing on a recording medium 7009. In the ink droplet, reference numeral 7003 indicates a nonionic surfactant and reference numeral 7001 indicates a surfactant-incompatible compound, and 7005 indicates a fluorescent coloring material (hereinafter referred to as "coloring material" merely), specifically at least one of a fluorescent compound and a coloring material exhibiting fluorescence properties, and 7007 indicates a liquid medium dissolving or dispersing the surfactant 7003, the compound 7001, and the coloring material 7005 therein. When such an ink droplet 7000 is applied on the recording medium 7009 to conduct recording as illustrated in FIG. 8, part of the ink components (particularly, liquid medium 7007) evaporates into the atmosphere or penetrates into the recording medium to diffuse, as illustrated in FIG. 9, whereby the constitution and compositional ratio of the ink on the recording medium are changed. As a result, the surfactant 7003 and the compound 7001, which were stably coexisting in the ink, undergo phase separation into a layered state on the recording medium to form interfaces between the ink components and between the ink droplet and the atmosphere as illustrated in FIG. 10. Therefore, a condition as if the recorded matter has been laminated is created.

Figure 11:
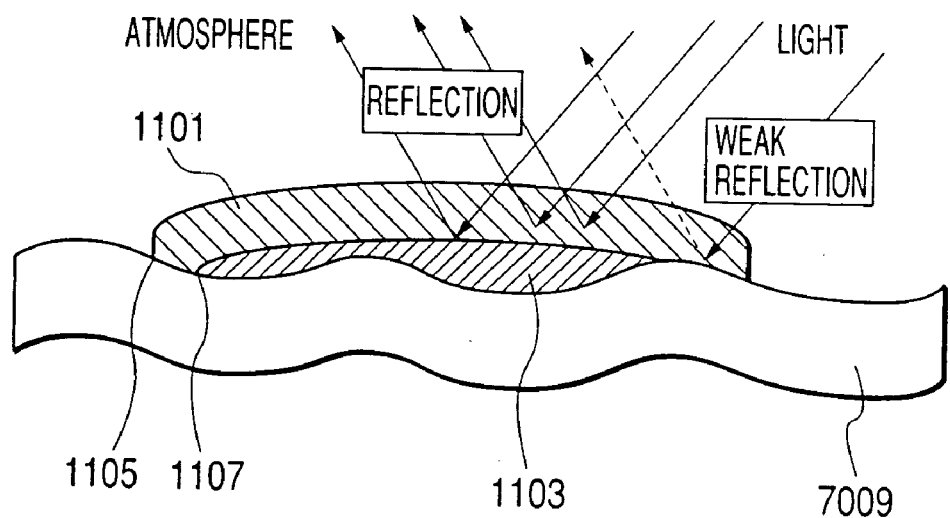
FIG. 11 illustrates the mechanism of color-fluorescence development according to the present invention.
Figure 12:
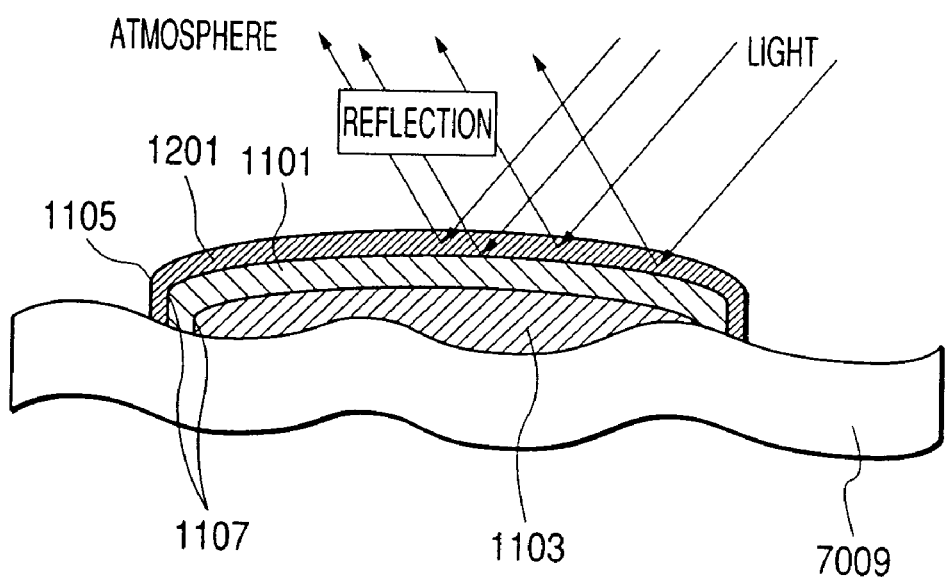
FIG. 12 illustrates the mechanism of color-fluorescence development according to the present invention.

FIG. 11 is a schematic illustration of the state shown in FIG. 10. The layer indicated by the reference numeral 1101 in FIG. 11 contains the nonionic surfactant 7003 and the coloring material 7005, while the layer indicated by the reference numeral 1103 contains the organic compound 7001 and the coloring material 7005. The surface of the layer 1101 forms a gas-liquid interface 1105, and the layers 1101 and 1103 form a liquid-liquid interface 1107 between them. As a result, in the recorded matter formed with the ink according to the present invention, the layer 1101 having a stable thickness is formed by the development of the liquid-liquid interface 1107. Moreover, reflection of light can effectively occur at the interface 1107 to achieve good color/fluorescence development, so that this is an effective measure to remarkably enhance fluorescence properties and color development of the recorded matter.

Furthermore, according to the study of the present inventors, it has been found that an ink comprising a fluorescent coloring material, a nonionic surfactant, an organic compound incompatible with the nonionic surfactant and a liquid dissolving or dispersing these components provides an image excellent in color including fluorescence. The present inventors consider that this is due to the fact that a micelle layer (1201) of the nonionic surfactant is formed as a surface layer covering the layers 1101 and 1103, and the reflection of light can occur more effectively at this surface layer 1201, so that the coloring/fluorescence intensity is enhanced.

Through further investigation, the present inventors have found that water is a preferable liquid medium. More specifically, when water is used as the liquid medium, in comparison with other liquid media, a wide variety of compounds can be used to widen the selection range of constituent materials of the ink. Water-based ink does not tend to lower the quality of recorded matter recorded on wood-free paper in comparison with non-aqueous ink, and the aqueous medium can be removed by penetration into the wood-free paper, and moreover, water is stable to evaporation. Use of water is thus preferred. In the recording process according to this invention, the ink is fed through a gap to a recording medium. On the other hand, when recording is conducted by applying pressure to ink in contact with the recording medium as with a ball point pen, since the ink is pushed into the recording medium, the mechanism of the present invention is less likely to work.

Next described are the components of the ink to be used in the recording process of the present invention.

The ink constituents, the nonionic surfactant and the organic compound incompatible with the surfactant, undergo phase separation into a layered state as water and oil when only the surfactant and the surfactant-incompatible compound are mixed. Specifically, in a three-component system containing a nonionic surfactant, a compound incompatible with the surfactant and water as a solvent, the surfactant and the surfactant-incompatible compound are initially dissolved in water. When water serving as a solvent evaporates in an environment of, for example, 50° C., the two compounds separate from each other. In particular, when the organic compound and the surfactant undergo liquid-liquid separation with evaporation of water, the mechanism of the present invention develops easily.

The liquid medium usable in the present invention is selected from among a wide variety of liquids in view of the combination of the nonionic surfactant and the surfactant-incompatible compound and its compatibility with these components. However, as described above, water is particularly preferred as the liquid medium. The reasons for using it include stability of the resulting ink, problems of print quality with non-aqueous liquid media, and ease of selection of the surfactant and the surfactant-incompatible compound. Accordingly, as a preferred embodiment of the present invention, all of the properly usable nonionic surfactants and surfactant-incompatible compounds are water-soluble or hydrophilic materials. Also, with regard to the interface formed in the recorded part as one of the working effects of the present invention, the nonionic surfactant and the surfactant-incompatible compound are preferable in liquid state at normal temperature.

The surfactant-incompatible compound may be any compound so far as it undergoes phase separation into a layered state as water and oil when it is mixed with a nonionic surfactant as described above. However, for example, one having a solubility parameter of at least 15 and that is incompatible with a nonionic surfactant is preferred. Herein, the solubility parameter values are determined by the Fedors method.

Preferable surfactant-incompatible compounds are those having a glycerin group. Since the glycerin group has strong hydrating force, such a compound serves easily as the "water" of "water and oil" as described above in the explanation of the phenomenon of the present invention. Among such compounds, monomer sugar alcohols such as glycerin, xylitol and erythritol, and dimer or trimer sugar alcohols such as diglycerin may be used.

Further, the above compounds can be addition products of ethylene oxide, propylene oxide or a combination thereof. Among these, those having at least three hydroxyl groups and that are liquid at normal temperature are particularly preferred. The content of these compounds in the ink is preferably controlled to 1.0 to 30% by weight, particularly 5.0 to 20% by weight based on the total weight of the ink. However, the present invention is not limited thereto depending on the recording medium used.

Nonionic surfactants to be used as a component of the ink according to the present invention in combination with the above organic compound are preferably liquid at normal temperature. It is also preferable that the nonionic surfactants do not separate in an aqueous solution (that is, ink without the coloring material). If a nonionic surfactant that separates in an aqueous solution is used in an ink using water as the preferred liquid medium, the ink becomes unstable. This indicates that the preferred nonionic surfactant can be apparently uniformly dissolved or dispersed in water. In particular, it is preferred to select a nonionic surfactant that forms an emulsion in water. It is further preferred that the content of the nonionic surfactant in the ink be selected to retain the emulsion state in the aqueous solution, for stability of the ink.

Among nonionic surfactants those having an HLB of not more than 13 may preferably be used in the present invention. In general, those having an HLB exceeding 13 become too hydrophilic making it difficult for phase separation to occur in the ink on the recording medium when an image is formed, which may prevent the working effect of the present invention that interfaces formed with ink components in the ink on the recorded medium enhance the color/fluorescence development. In the case of organic compounds having a solubility parameter of not less than 15, especially, it is preferable to use a nonionic surfactant having a solubility parameter of not more than 13. If these solubility parameter values are too close, the working effect of the present invention may not be achieved due to high compatibility of both components.

The specific content of the nonionic surfactant in the ink according to this embodiment is preferably controlled to at least 1% by weight, more preferably 1 to 20% by weight based on the total weight of the ink. When the content is less than 1% by weight, the above-described mechanism is not effectively developed, and when it is more than 20% by weight, balance of print quality between, for example, feathering (whisker-like blur), fixing ability and image density, is liable to be deteriorated.

Among the nonionic surfactants satisfying the above-described requirements, particularly preferable compounds include compounds having an acetylene group represented by the following general formula (I) and the following compounds (II) to (VII).

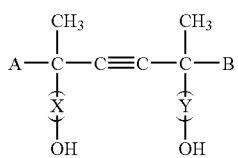
(I)

wherein A and B are independently $C_nH_{2n+1}$ (n being an integer of 1 to 10), and X and Y are independently a ring-opened ethylene oxide unit and/or a ring-opened propylene oxide unit.

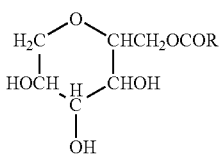

1,5-Sorbitan ester (II)

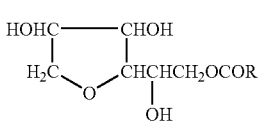

1,4-Sorbitan ester (III)

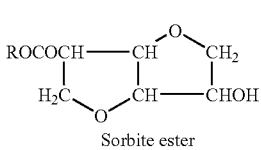

Sorbite ester (IV)

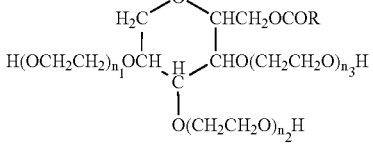
(V)

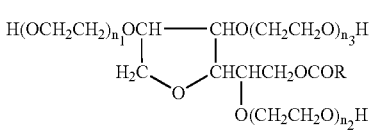
(VI)

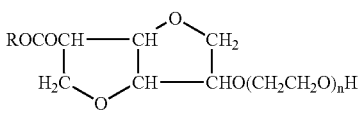
(VII)

(R: alkyl group of a fatty acid)

Among the nonionic surfactants represented by the general formula (I), compounds represented by the following general formula (VIII) are particularly preferred.

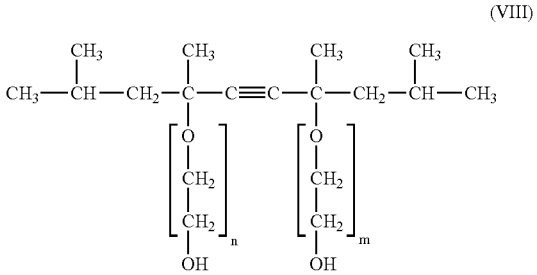
(VIII)

wherein m and n are integers.

The ink used in this embodiment according to the present invention further comprises a compound having fluorescence properties. In particular, the mechanism described above fully demonstrates its effect when the ink contains a fluorescent coloring material such as fluorescent dyes. As described above, since the ink of the invention tends to exhibit better results in an aqueous system containing water as the liquid medium, it is preferred that the ink of the present invention comprises a water-soluble or hydrophilic compound as the fluorescent coloring material.

The water-soluble or hydrophilic fluorescent coloring materials include, for example, compounds or coloring materials soluble in water by themselves (for example, fluorescence brightener and fluorescence paint), and also compounds or coloring materials apparently dissolved in water, which are inherently hydrophobic but are made hydrophilic by a surface treatment and emulsified in water. However, coloring materials merely dispersed by using a resin as a dispersing agent as with a pigment dispersion, are not included. The reason for this is that it is difficult for this type of coloring material to develop the effect of the above-described mechanism, and moreover it may not be a very preferable selection from the viewpoint of reliability of the resulting ink. All the states of the compounds exhibiting fluorescence properties and fluorescent coloring materials in a liquid medium as described above will hereinafter be represented as "dissolution" unless expressly noted.

As the compounds exhibiting fluorescence properties and fluorescent coloring materials to be used, those containing any of the following atomic groups are particularly preferred:

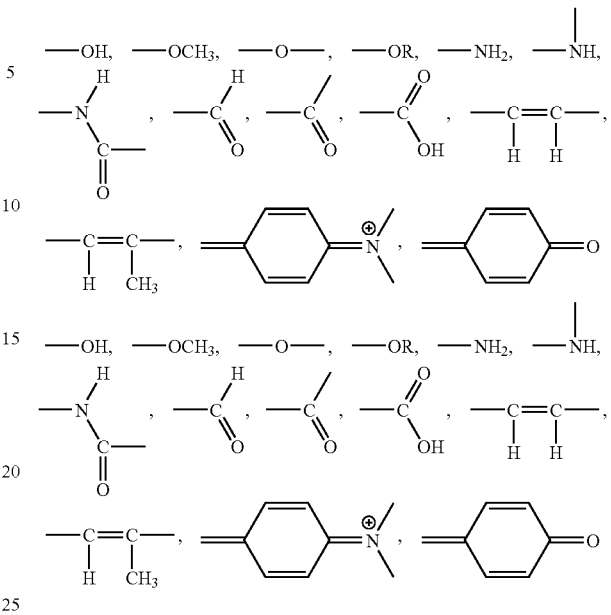

Specific examples of the fluorescent coloring materials containing any of such atomic groups as described above include the following compounds.

| Name of dyes | Structure | Color under daylighting | Fluorescent color |
|---|---|---|---|
| Brilliantsulfoflavine FF (C.I.56205) | | yellow | green to yellowish green |
| Basic yellow HG (C.I.46040) | | yellow | greenish yellow to yellow |

-continued

| Name of dyes | Structure | Color under daylighting | Fluorescent color |
|---|---|---|---|
| Eosine (C.I.45380) | | red | yellow to orange |
| Rhodamine 6G (C.I.45160) | | red | yellow to orange |
| Rhodamine B (C.I.45170) | | pink | orange to red |
| Lumogen L Yellow | | | |
| Lumogen L Brilliant Yellow | | | |
| Lumogen L Yellow Orange | | | |

-continued

| Name of dyes | Structure | Color under daylighting | Fluorecent color |
|---|---|---|---|
| Lumogen L Red Orange | 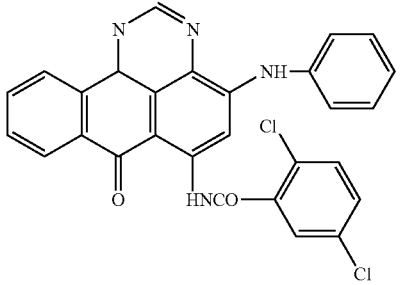 | | |

As the fluorescent coloring material, for example, fluorescent brightening agents commonly used can be used.

The content of such fluorescent coloring materials as mentioned above in the ink is preferably controlled to at most 1.5% by weight, more preferably at most 1.0% by weight. The fluorescent coloring material has a nature that when its content in the ink exceeds a certain value, the fluorescence intensity of the ink is lowered (this phenomenon is referred to as concentration quenching). For this reason, the concentration quenching cannot be prevented by the above-described mechanism if the concentration exceeds 1.5% by weight. When only the fluorescence properties are considered to be most important, it is particularly preferred that the content be at most 0.5% by weight.

From the viewpoint of the stability of the ink, a monohydric alcohol may also be additionally used in combination in the ink according to this embodiment. The monohydric alcohol has an effect to mix water with oil like, for example, dehydration of gasoline. This indicates that the monohydric alcohol is preferably used in combination in the ink from the viewpoint of the stability of the ink upon development of the above-described mechanism.

In addition, the monohydric alcohol has a good effect for evaporation and penetration into a recording medium when the resulting ink is applied to the recording medium. Therefore, the monohydric alcohol is useful for better developing the effect of the present invention. The content of the monohydric alcohol in the ink according to this embodiment is 0.1 to 20% by weight, preferably 0.5 to 10% by weight based on the total weight of the ink. Specific examples of the monohydric alcohol usable as a component of the inks according to this embodiment include ethanol, isopropanol and n-butanol.

A water-holding agent may also be used in combination in the inks according to this embodiment. As the water-holding agent, may be preferably used a compound selected from urea and urea derivatives. When at least one compound selected from urea and urea derivatives is contained in the ink, the stability of the ink is improved. More specifically, when a compound selected from urea and urea derivatives is contained, the mechanism that the nonionic surfactant and the surfactant-incompatible compound in the ink undergo phase separation into a layered state is prevented from being developed at a gas-liquid interface in a state of an ink. In addition, the compound selected from urea and urea derivatives also has an effect as a solvent aid, and so the use of such a compound is also preferred from the viewpoint of stability of the ink.

When the recording medium is, for example, wood-free paper, the effect by the mechanism according to the present invention is easily developed due to the water-holding ability of the wood-free paper. More specifically, it is expected that water is held in the recording medium, whereby the time taken when the ink components are released into the recording medium and the atmosphere can be slowed, and so the phase separation of the two organic compounds incompatible with each other into the layered state is expected to be well carried out.

As the urea derivatives, compounds other than cyclic compounds are preferred, and at least one compound selected from alkyl derivatives of urea and ethylene oxide and/or propylene oxide adducts of urea, or a compound suitably selected from derived compounds modified by at least two of the above derivative groups is preferably used. However, the selection varies depending on the amounts and kinds of individual components making up the ink. That soluble in water is preferably used. No particular limitation is imposed on the amount of such a compound used. However, it is generally contained in a range of preferably from 0.1 to 15% by weight, more preferably from 0.1 to 10% by weight based on the total weight of the ink.

In the inks according to this embodiment, may be contained various additives such as a water-soluble organic solvent, a surfactant, a rust preventive, a preservative, a mildewproofing agent, an antioxidant, anti-reducing agent, an evaporation accelerator, a chelating agent, a water-soluble polymer and a pH adjustor, as needed.

As the liquid medium used in the inks according to this embodiment, water is preferably used as described above. More preferred is a mixture of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethyl sulfoxide; cyclic amide compounds such as 2-pyrrolidone and E-caprolactam; and imide compounds such as succinimide.

As a compound capable of being added to the ink according to the present invention, a compound having a solubility parameter value between that of the above described nonionic surfactant and that of the surfactant-incompatible compound is preferably used. The ink having such a composition shows improved stability even in the gas-liquid interface of such ink when the ink is used for the formation of images. As such a compound, especially preferable is a glycol compound in a liquid state at a normal temperature. The amount of the compound to be used is, without limitation, preferably 0.1 to 15% by weight, more preferably 0.1 to 10% by weight based on the total weight of the ink.

The content of such a water-soluble organic solvent as described above is generally within a range of preferably from 1 to 40% by weight, more preferably from 3 to 30% by weight based on the total weight of the ink. The content of water in the ink is generally within a range of from 30 to 95% by weight based on the total weight of the ink. If the content lies within this range, the solubility of the coloring material and the like is hardly deteriorated, and the viscosity of the resulting ink is also hardly increased. In addition, an evaporating component is not too much to satisfy sufficient stick preventing properties.

In the inks according to this embodiment, in addition to the fluorescent coloring material, a coloring material exhibiting no fluorescence properties may be contained to adjust the color tone of the inks. As the coloring material used in this case, a coloring material soluble in water is preferred from the viewpoint of stability of the resulting ink (as with the fluorescent coloring material, including those which appear to be dissolved in water by, for example, emulsification in this case). When the water fastness of a recorded matter formed with the ink according to the present invention is taken into consideration, a coloring material (direct dye) directly coloring a recording medium is preferably used in view of the stability of the resulting ink as well. A coloring material having an azo group in its structure is more preferred. As the coloring material exhibiting no fluorescence properties, is preferably used a coloring material having a carboxyl group or its salt group in the structure thereof. A coloring material having only a carboxyl group or its salt group as a hydrophilic group of the coloring material is more preferred for use. Since the carboxyl group is weak in affinity for water compared with a sulfonic group, the water fastness of the recorded matter formed with the ink according to the present invention can be improved.

The content of the coloring material exhibiting no fluorescence properties in the inks according to this embodiment is preferably not lower than the content of the fluorescent coloring material as described above. The ink used in the present invention is made up in such a manner that a compound containing a fluorescent coloring material is caused to be suspended at the gas-liquid interface, thereby improving fluorescence properties. The fluorescent coloring material can not be added in the ink in a large amount. Even when visually observing a printed matter and having lost fluorescence properties by contact of the recorded matter with water, this well maintains the recorded condition and prevents completely loss of the details recorded. However, when the coloring material exhibiting no fluorescence properties is selected, it is preferable that it be suitably selected according to the developed state of fluorescence properties in a recorded matter formed with the fluorescent coloring material, or balance with the coloring ability thereof.

Specific examples of the coloring material exhibiting no fluorescence properties are those with a dimer structure including Direct Black 168, Direct Black 154, disazo coloring material having a strong directivity, trisazo coloring material, Direct Yellow 142, Direct Yellow 86, Direct Red 227, Direct Red 80, gold-containing coloring materials such as Direct Blue 199, and coloring materials represented by the following general formulae (A), (B) and (C) in the form of a free acid. However, the present invention is not limited to these coloring materials.

Coloring material represented by the general formula (A) in the form of a free acid:

$$Pc(SO_3H)_t(SO_2\text{—}NR^1\text{-L-}NR^2\text{—}X\text{—}NR^3\text{-G})_q \qquad (A)$$

wherein Pc is a metallized phthalocyanine nucleus, $R^1$, $R^2$ and $R^3$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), L is a divalent organic linking group (for example, a methylene or ethylene group), X is a carbonyl group or a group represented by the following formula (2), (3) or (4)

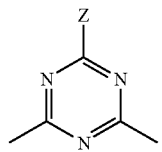

(2)

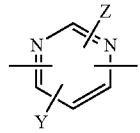

(3)

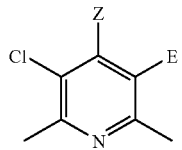

(4)

wherein Z in each of the formulae (2) to (4) is $NR^4R^5$, $SR^6$ or $OR^6$, Y in the formula (3) is H, Cl, Z, $SR^7$ or $OR^7$, E in the formula (4) is Cl or CN, $R^4$, $R^5$, $R^6$ and $R^7$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), aryl group (for example, a phenyl group), substituted aryl group (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), in which R4 and R5 may form a 5- or 6-membered ring together with nitrogen, G in the general formula (A) is a colorless organic residue substituted by 1 or 2 COSH or COOH, and t+q is 3 or 4.

Examples of the compounds represented by said general formula (A) include the following materials. Exemplified Coloring Material (1):

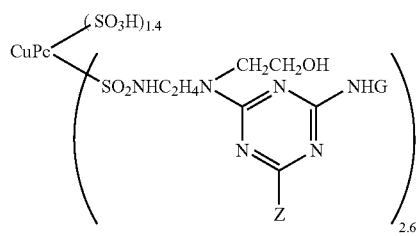

Coloring material represented by the general formula (B) in the form of a free acid:

$$Ar^1N=NJX(NR^1LNR^2X)_nJN=NAr^2 \quad (B)$$

wherein J is the following formula

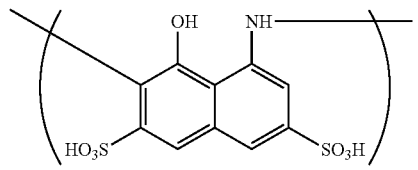

$Ar^1$ and $Ar^2$ are, independently of each other, an aryl group (e.g., a phenyl group) or a substituted aryl group (e.g., a phenyl group substituted by at least one substituent selected from halogen (fluorine, chlorine, bromine etc.), alkoxyl groups having 1 to 3 carbon atoms, linear or branched alkyl groups having 1 to 3 carbon atoms, and the like), in which at least one of $Ar^1$ and $Ar^2$ is a substituted aryl group having at least one substituent selected from COOH and COSH, $R^1$ and $R^2$ are, independently of each other, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), or substituted alkenyl group (for example, an alkenyl group at least one hydrogen of which has been substituted by halogen (fluorine, chlorine, bromine or the like), an alkoxy group having 1 to 3 carbon atoms, or the like), L is a divalent organic linking group, n is 0 or 1, and X is a carbonyl group or a group represented by the following formula (2), (3) or (4)

(2)

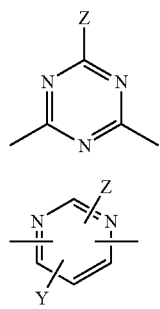

(3)

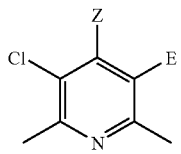

-continued (4)

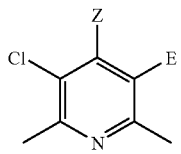

wherein Z in each of the formulae (2) to (4) is $NR^3R^4$, $SR^5$ or $OR^5$, Y in the formula (3) is H, Cl, Z, $SR^6$ or $OR^6$, E in the formula (4) is Cl or CN, $R^3$, $R^4$, $R^5$ and $R^6$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), aryl group, substituted aryl group, aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), alkoxy groups having 1 to 3 carbon atoms and the like), or $R^4$ and $R^5$ may form a 5- or 6-membered ring together with nitrogen, with the proviso that the compounds represented by the general formula (B) have at least the same number of groups selected from COOH and COSH as the number of $SO_3H$.

Examples of the compounds represented by the general formula (B) include the following materials.

Exemplified Coloring Material (2):

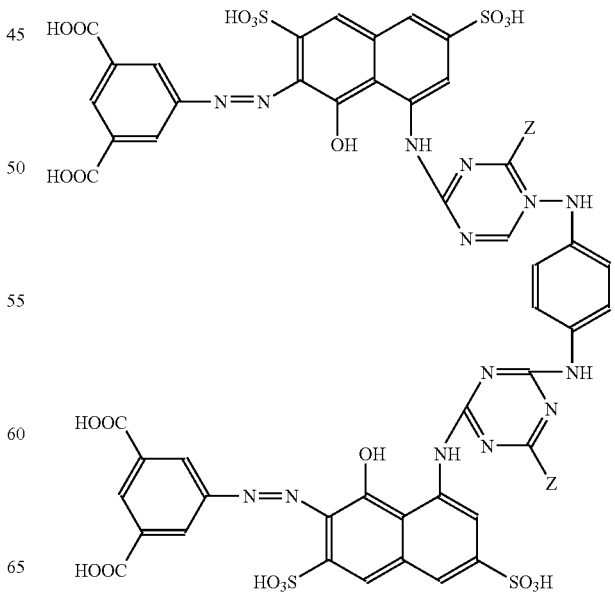

Exemplified Coloring Material (3):

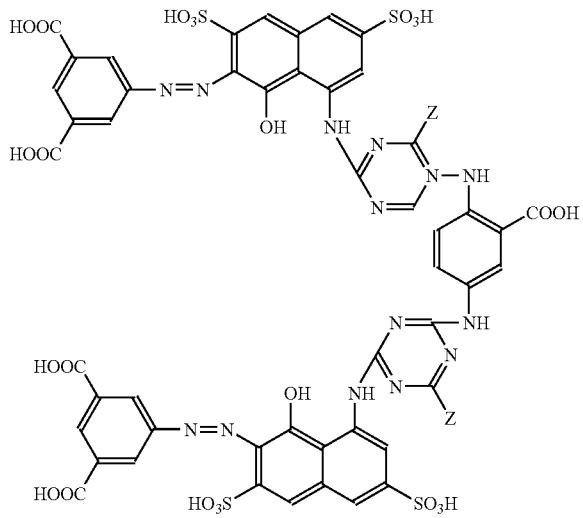

Exemplified Coloring Material (4):

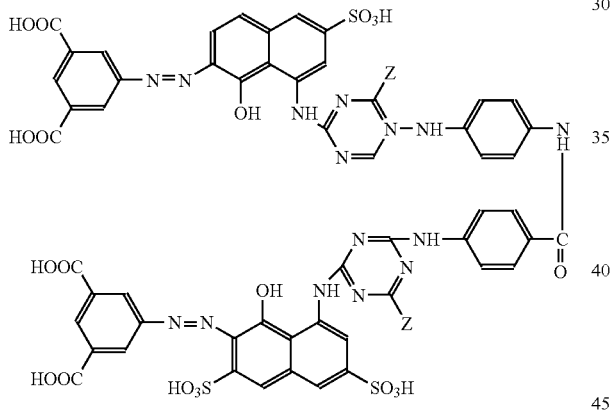

Exemplified Coloring Material (5):

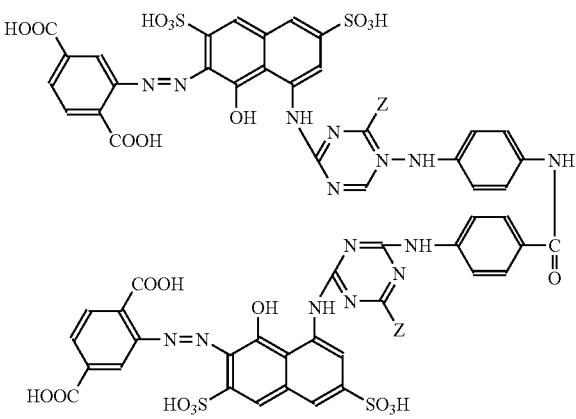

Coloring material represented by the general formula (C) in the form of a free acid:

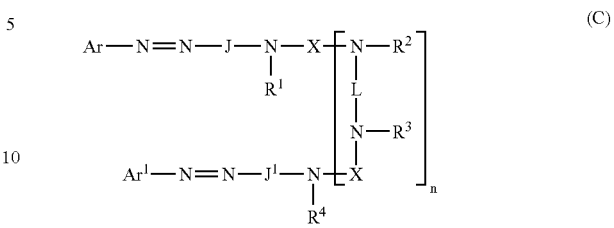

(C)

wherein Ar and $Ar^1$ are, independently of each other, an aryl group (for example, a phenyl group) or substituted aryl group, at least one of Ar and $Ar^1$ is a substituted aryl group having a substituent selected from the group consisting of sulfonic, carboxyl and thiocarboxyl groups, J and $J^1$ are, independently of each other, a group represented by the following formula (2), (3) or (4)

(2)

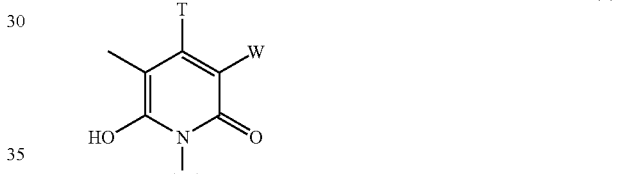

(3)

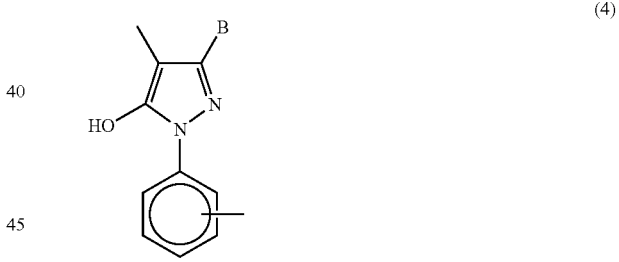

(4)

wherein $R^5$ in the formula (2) is selected from hydrogen, alkyl groups (for example, linear or branched alkyl groups having 1 to 20 carbon atoms), substituted alkyl groups (for example, alkyl groups at least one hydrogen of which has been substituted by halogen (fluorine, chlorine, bromine or the like), an alkoxy group having 1 to 3 carbon atoms, or the like), alkoxy groups (for example, methoxy and ethoxy groups), halogen (for example, fluorine, chlorine and bromine), CN, ureide group and $NHCOR^6$ ($R^6$ being selected from hydrogen, alkyl groups (for example, linear or branched alkyl groups having 1 to 20 carbon atoms), substituted alkyl groups (for example, alkyl groups at least one hydrogen of which has been substituted by halogen (fluorine, chlorine, bromine or the like), an alkoxy group having 1 to 3 carbon atoms, or the like), aryl groups (for example, a phenyl group), substituted aryl groups (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl groups (for example, phenylmethyl and phenylethyl groups), and substituted aralkyl group (for example, aralkyl groups the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like)), T in the formula (3) is an alkyl group, W is selected from hydrogen, CN CONR$^{10}$R$^{11}$, pyridinium group and carboxyl group, m is an alkylene group having 2 to 8 carbon atoms. Said R$^{10}$ and R$^{11}$ are independently of each other, selected from hydrogen, alkyl groups (for example, linear or branched alkyl groups having 1 to 20 carbon atoms) and substituted alkyl groups (for example, alkyl groups at least one hydrogen of which has been substituted by halogen of fluorine, chlorine, bromine or the like, or an alkoxy group having 1 to 3 carbon atoms, or the like). B in the formula (4) is selected from hydrogen, alkyl groups (for example, linear or branched alkyl groups having 1 to 20 carbon atoms) and carboxyl group.

R$^1$, R$^2$, R$^3$ and R$^4$ in the formula (C) are, independently of one another, selected from hydrogen, alkyl group and substituted alkyl group, L is a divalent organic linking group, n is 0 or 1, and X is a carbonyl group or a group represented by the following formula (5), (6) or (7)

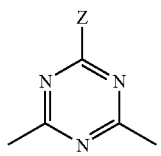
(5)

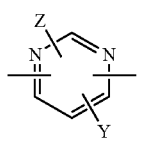
(6)

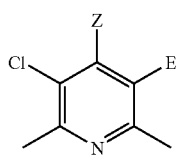
(7)

wherein Z in each of the formulae (5) to (7) is selected from OR$^7$, SR$^7$ and NR$^8$R$^9$, Y in the formula (6) is selected from hydrogen, Cl, CN and Z, E in the formula (7) is selected from Cl and CN, R$^7$, R$^8$ and R$^9$ are, independently of one another, hydrogen, alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), substituted alkyl group (for example, an alkyl group at least one hydrogen of which has been substituted by halogen (fluorine, chlorine, bromine or the like), an alkoxy group having 1 to 3 carbon atoms, or the like), aryl group (for example, a phenyl group), substituted aryl group (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), R$^8$ and R$^9$ may form a 5- or 6-membered ring together with nitrogen, with the proviso that when the compounds of the general formula (C) have no sulfonic group, the compounds have at least two groups selected from carboxyl and thiocarboxyl groups, or the compounds of the general formula (C) have at least the same number of groups selected from carboxyl and thiocarboxyl groups as the number of the sulfonic group.

Examples of the compounds represented by the general formula (C) include the following materials.

Exemplified Coloring Material (6):

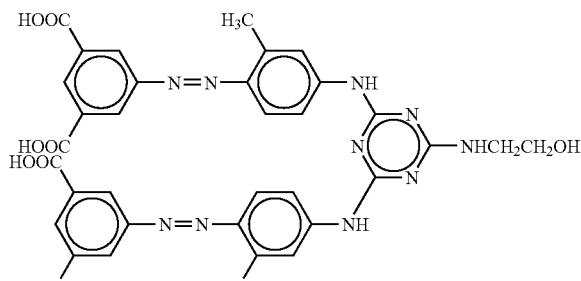

Exemplified Coloring Material (7):

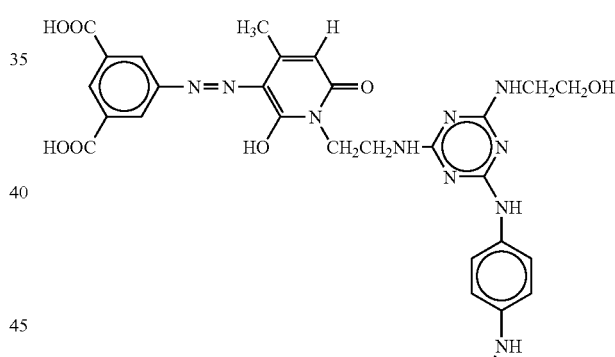

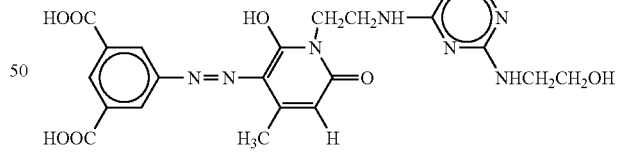

Exemplified Coloring Material (8):

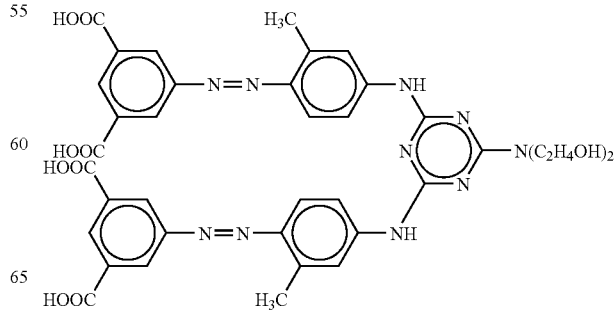

-continued

Exemplified Coloring Material (9):

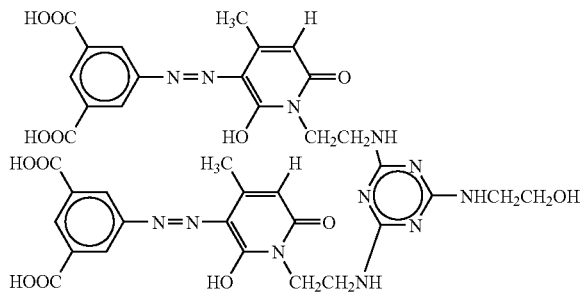

Exemplified Coloring Material (10):

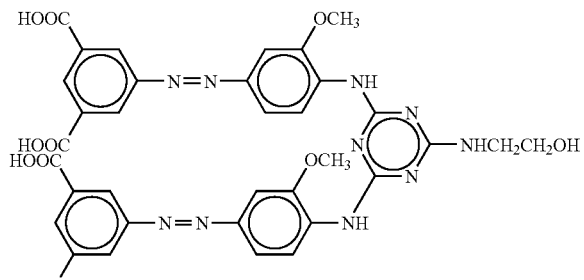

Exemplified Coloring Material (11):

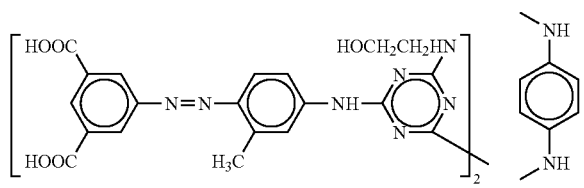

No particular limitation is imposed on the amount of such coloring material exhibiting no fluorescence properties as described above to be used. However, it is generally within a range of preferably from 0.1 to 15% by weight, more preferably from 0.1 to 10% by weight based on the total weight of the ink.

For example, the inks according to this embodiment preferably have a surface tension of at most 40 dyn/cm because in order to develop the above-described mechanism, it is preferred that for example, an ink droplet spreads after recording to achieve the effect of the mechanism. Further, the pH of the inks according to this embodiment is preferably at least 8 from the viewpoint of stability of the inks.

In the inks according to this embodiment, it is preferred that an alkali metal ion and an ammonium ion be used in combination. When both ions are used in combination, the stability and ejection stability of the resulting ink are improved when the ink is used in ink-jet recording. As examples of the alkali metal ion, may be mentioned $Li^+$, $Na^+$ and $K^+$. The inks according to this embodiment are preferably adjusted to be nonionic in an ink system from which the coloring material and additives have been removed.

In the inks according to this embodiment, it is preferred from the viewpoint of increasing the fluorescence intensity of the resulting image that the fluorescent coloring material is contained in the ink at least in a concentration sufficient to exhibit the maximum fluorescence intensity in the inks. Inferentially, the reason for it is considered to be due to the fact that since the apparent concentration of a coloring material is lowered by feathering or bleeding, penetration and the like of an ink when recording is conducted with a water-based ink on a recording medium, good coloring is retained on a selected recording medium when recording is conducted on the recording medium with the ink having such a composition.

With regard to a recording method according to the present invention, the ink comprising the components described above is stored in an ink container formed from a compound selected from the group consisting of polyacetates and polyolefins, or in an ink container containing an ink-holding member formed from such a compound, and then the ink is fed to a recording member through a gap. Particularly, an ink-holding member made of polypropylene, as one of polyolefins or condensed compounds such as polypropylene fibers, is preferably used. In addition, the ink-holding member formed from such a material as described above may preferably be porous, multi-layered and/or fibrous aggregate.

For example, a compound selected from the group consisting of polyacetates and polyolefins generally shows a high stability to the influence of pH value, water and organic solvents. As a result of studying the stability by the present inventors, it was confirmed that the ink used in the present invention has favorable properties which are not deteriorated even if the ink is retained in a specific ink-holding member and/or ink receiving member formed from such a material for a long time, to thereby maintain stably an excellent reliability when the ink is used in the formation of images.

As described above, the ink used in the present invention can exhibit an advantageous effect when it is used in a recording method supplying the ink onto a recording medium through a gap, although it may be used as an ink for stationery. Particularly, if it is used in an ink-jet recording method that provides a recorded matter by discharging ink droplets through an orifice in accordance with recording signals onto a recording medium, the above described ink expresses a remarkable advantage. Since the ink-jet recording method is to effect recording by making ink droplets strike the surface of a recording medium to permeate into or spread over the recording medium unlike regular writing instruments such as a ball-point pen utilizing writing pressure against the recording medium, good coloring properties including the fluorescence intensity of coloring materials can be realized by controlling the surface state of ink droplets in accordance with the above-described mechanism, thereby resulting in obtaining recorded matters with high image quality.

Ink-jet recording methods include a recording method in which mechanical energy is applied to an ink to eject droplets of the ink, and a recording method in which thermal energy is applied to an ink to eject droplets of the ink by bubbling of the ink. The inks according to the present invention are particularly suitable for use in an ink-jet recording method of a type that an ink is ejected by the bubbling phenomenon of the ink caused by thermal energy. In the case of an ink-jet recording method of this type, the ejection of the ink becomes extremely stable, and no satellite dots are generated. In some cases, however, the thermal properties (for example, specific heat, coefficient of thermal expansion, heat conductivity, etc.) of the inks may be controlled.

From the viewpoint of improving the matching of the inks with an ink-jet head, the inks according to the invention may desirably be controlled so as to have, as their own physical properties at 25° C., a surface tension of 30 to 40 mN/m (dyn/cm) and a viscosity of 15 cP or lower, preferably 10 cP or lower, more preferably 5 cP or lower. In order to control the inks to have the above physical property values to solve problems in recording on plain paper, the amount of water contained in the inks according to the invention is preferably controlled to not less than 50% by weight, but not more than 98% by weight, more preferably not less than 60% by weight, but not more than 95% by weight.

A preferable apparatus, as an ink-jet recording apparatus to carry out recording by use of an ink of the present invention, is such that gives thermal energy to the ink in a recording head corresponding to recording signals, and generates liquid droplets by thermal energy.

Figure 2:
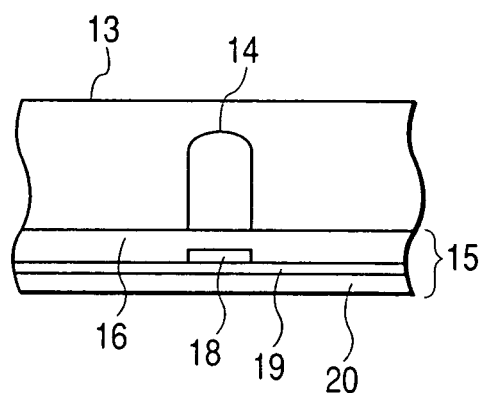
FIG. 2 is a transverse cross-sectional view of the head of the ink-jet recording apparatus.
Figure 3:
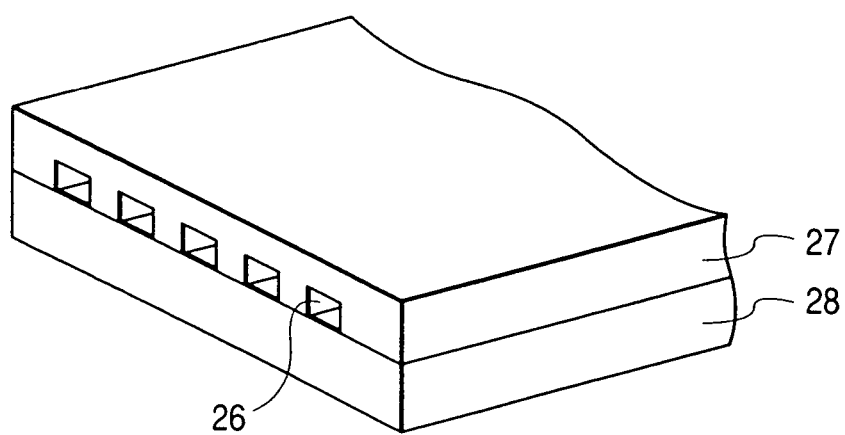
FIG. 3 is a perspective view of the appearance of a multi-head which is an array of heads as shown in FIG. 1.

Examples of the construction of a head, which is a main component of such an apparatus, are illustrated in FIGS. 1, 2 and 3. FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a groove 14 through which an ink is passed, to a heating head 15 for thermal recording (not limited to such a thin-film head as illustrated by the drawings). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating properties.

An ink 21 comes up to an ejection orifice (a minute opening) 22 and forms a meniscus 23 due to a pressure P. Now, upon application of electric signals to the aluminum electrodes 17-1 and 17-2, the heating head 15 rapidly generates heat at the region shown by "n" to form bubbles in the ink 21 which is in contact with this region. The meniscus 23 of the ink is projected by the pressure thus produced, and the ink 21 is ejected in the form of ink droplets 24 from the ejection orifice 22 toward a recording medium 25.

FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
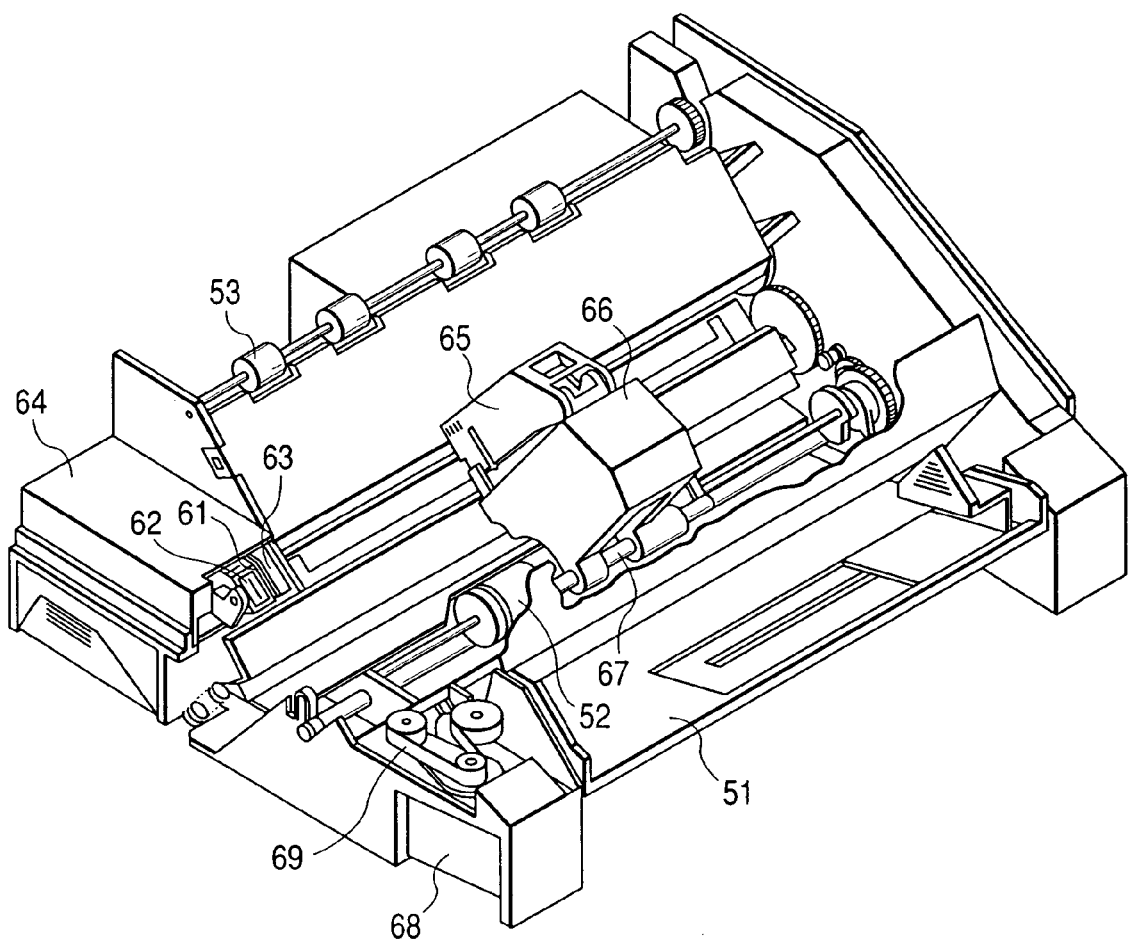
FIG. 4 is a perspective view illustrating an exemplary ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in the direction perpendicular to a direction in which the recording head 65 is moved, and comes into contact with the face of ejection openings to cap it. Reference numeral 63 denotes an ink absorbing member provided adjoiningly to the blade 61 and, similarly to the blade 61, held in such a form that it protrudes into the course through which the recording head 65 is moved.

The above-described blade 61, cap 62 and ink absorbing member 63 constitute an ejection-recovery portion 64, where the blade 61 and the ink absorbing member 63 remove water, dust and/or the like from the face of the ink-ejecting openings. Reference numeral 65 designates the recording head having an ejection-energy-generating means and serving to eject ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. By this construction, the recording medium is fed to the position opposite the ejection opening face of the recording head 65 and delivered to the delivery portion provided with the delivery roller 53 as recording progresses. In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also during the period when the recording head 65 is moved between recording regions for the purpose of recording, where it is moved to the home position adjacent to each recording region at given intervals, whereby the ejection opening face is wiped in accordance with this movement.

Figure 5:
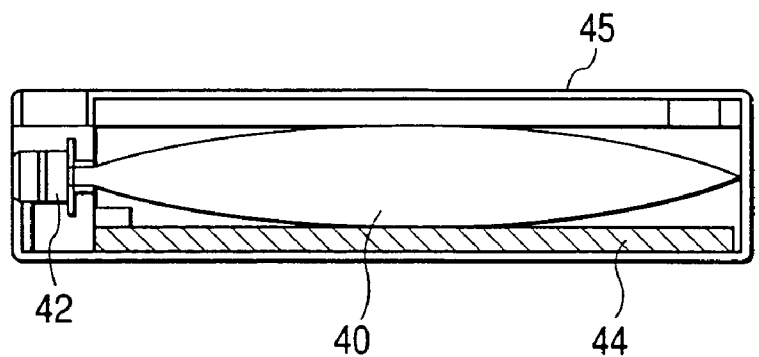
FIG. 5 is a longitudinal cross-sectional view of an ink cartridge.

FIG. 5 illustrates an exemplary ink cartridge 45 in which an ink to be fed to a head through a member for feeding the ink, for example, a tube is contained. Here, reference numeral 40 designates an ink container containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink. The ink container in the present invention is formed from a compound selected from the group consisting of polyacetates and polyolefins. It is preferred that the ink container 40 be formed of a polyolefin, in particular, polypropylene, at its surface with which the ink comes into contact.

Figure 6:
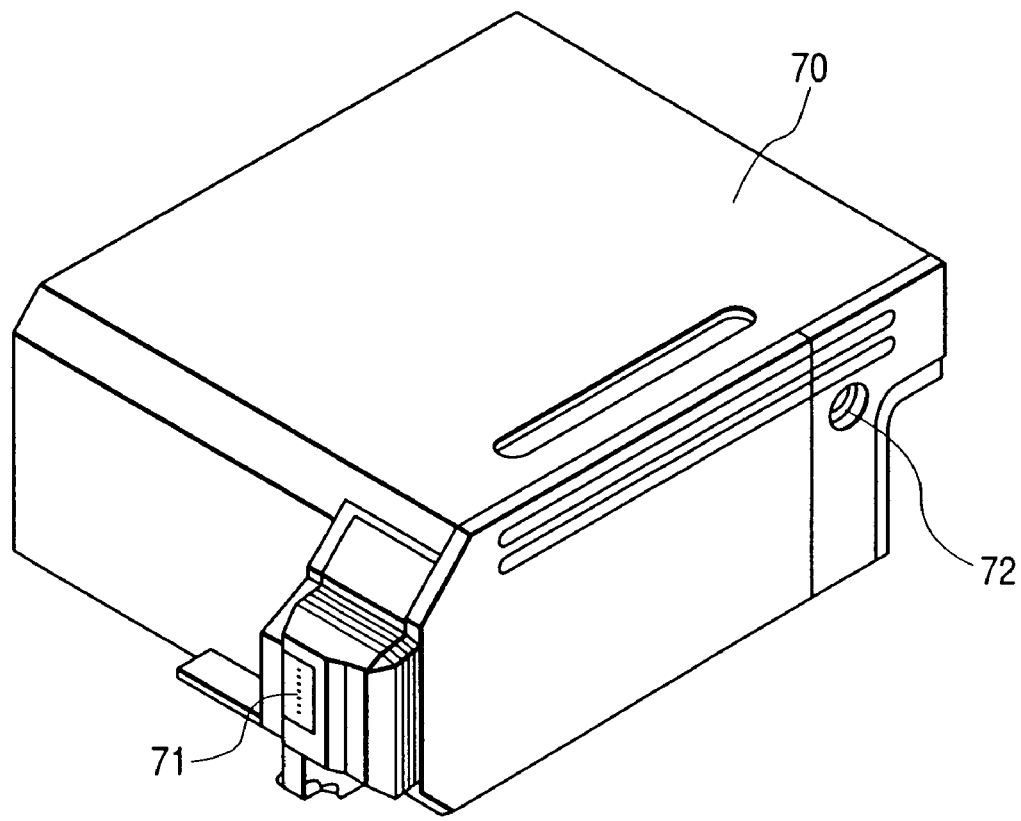
FIG. 6 is a perspective view illustrating an exemplary printing device.

The ink-jet recording apparatus according to the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container containing an ink, for example, an ink-holding member, is contained. The recording unit 70 is so constructed that the ink in such an ink-holding member is ejected in the form of ink droplets through a head portion 71 having a plurality of orifices.

While polymers of inorganic compounds, polyvinyl acetate, polyolefins or the like are commonly used as a material for the ink-holding member, but as mentioned above, in the present invention, the ink-holding member is made of those compounds selected from the group including polyvinyl acetate and polyolefins. Further, while an ink-holding member made of a porous material or having a multi-layer structure is preferably used, it is particularly preferred to use compressed fiber aggregate from the viewpoints of the ink holding properties, ink ejecting properties, and reliability. It is preferred to use an ink-holding member having a multi-layer structure or fiber aggregate of which multi-layer arrangement or the fiber arrangement in the ink container is aligned in an ink discharging direction. It is also preferred to use an ink-holding member having a contact surface with the ink container. Reference numeral 72 indicates an air passage for communicating the interior of the recording unit 70 with the atmosphere. This recording unit 70 is used in place of the recording head 65 shown in FIG. 4, and is detachably installed on the carriage 66.

Figure 13:
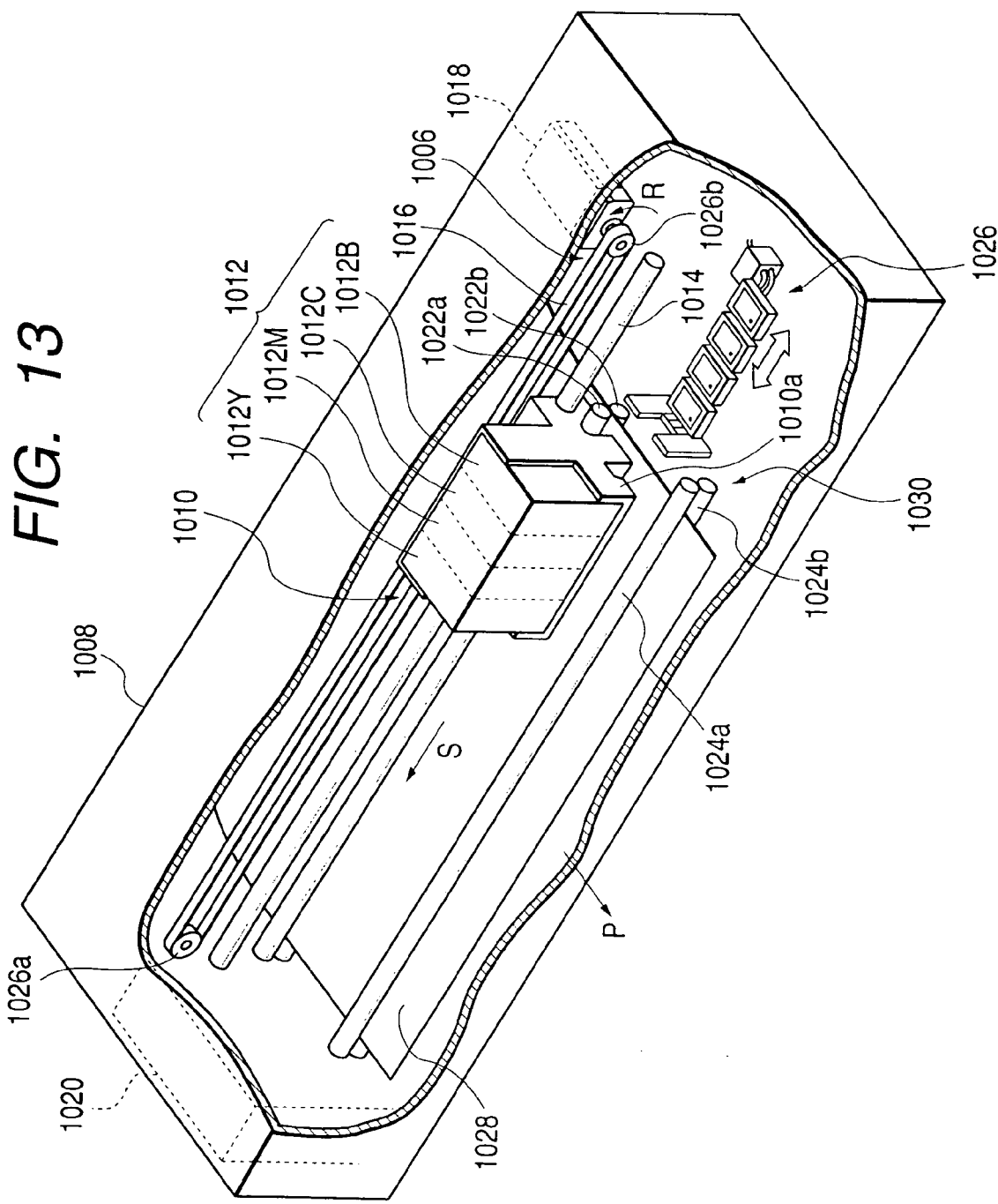
FIG. 13 is a schematic perspective view illustrating the main portion in an exemplary ink-jet printer in which an ink ejection head may be installed.

Other specific examples of the recording apparatus and recording heads preferably used in the present invention will hereinafter be described. FIG. 13 is a schematic perspective view illustrating principal parts of a liquid-ejecting head of an ejection system that a bubble communicates with the atmosphere upon ejection, and an exemplary ink-jet printer as a liquid-ejecting apparatus using this head.

In FIG. 13, the ink-jet printer comprises a conveying device 1030 for intermittently conveying paper 1028 as a recording medium provided along the longitudinal direction in a casing 1008 in a direction shown by an arrow P, a recording part 1010 reciprocatingly moved in a direction substantially parallel to a guide shaft 1014 in a direction of an arrow S substantially perpendicular to the conveying direction P of the paper 1028 by the conveying device 1030, and a driving part 1006 for movement as a driving means for reciprocatingly moving the recording part 1010.

The conveying device 1030 comprises a pair of roller units 1022a and 1022b and a pair of roller units 1024a and 1024b arranged in substantially parallel with and in opposed relation to each other, and a driving part 1020 for driving these respective roller units. By this construction, the paper 1028 is intermittently conveyed in a state that it is held between the respective roller units 1022a and 1022b and the roller units 1024a and 1024b in a direction shown by the arrow P in FIG. 13 when the driving part 1020 of the conveying device 1030 is operated.

The driving part 1006 for movement comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 and arranged in substantially parallel to the roller units 1022a and 1022b in forward and reverse directions.

When the motor 1018 is operated to rotate the belt 1016 in a direction shown by an arrow R in FIG. 13, the carriage member 1010a of the recording part 1010 is moved by the prescribed movement in the direction shown by the arrow S in FIG. 13. When the motor 1018 is operated to rotate the belt 1016 in a direction reverse to the direction shown by the arrow R in FIG. 13, the carriage member 1010a of the recording part 1010 is moved by the prescribed amount of movement in a direction reverse to the direction shown by the arrow S in FIG. 13. At an end of the driving part 1006 for movement, a recovery unit 1026 for conducting an ejection-recovery operation for the recording part 1010 is provided in opposed relation to an array of ink-ejection openings of the recording part 1010 at the home position of the carriage member 1010a.

In the recording part 1010, ink-jet cartridges (hereinafter may be referred merely to as "cartridges" in some cases) 1012Y, 1012M, 1012C and 1012B for respective colors, for example, yellow, magenta, cyan and black, are detachably mounted on a carriage member 1010a.

Figure 14:
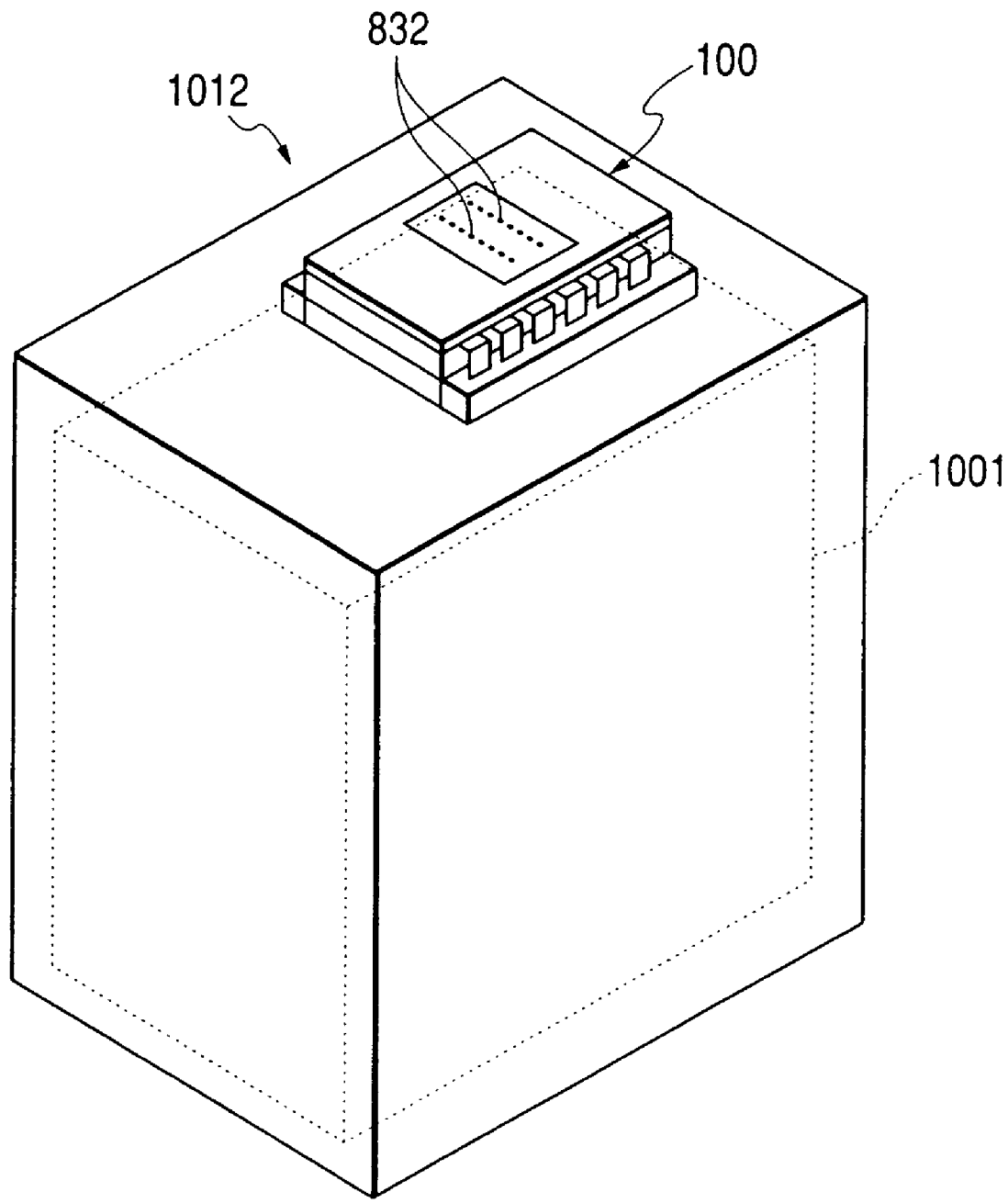
FIG. 14 is a schematic perspective view illustrating an exemplary ink-jet cartridge equipped with the ink ejection head.

FIG. 14 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink.

In the ink-jet recording head 100, a large number of ejection openings 832 for ejecting the liquid are formed, and the liquid such as an ink is directed to a common liquid chamber (see FIG. 15) in the liquid-ejecting head 100 through a liquid feed passage (not illustrated) from the liquid tank 1001. The cartridge 1012 shown in FIG. 14 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

A specific example of the above-described liquid-ejecting head capable of being mounted on the ink-jet printer of such a construction will hereinafter be described in detail.

Figure 15:
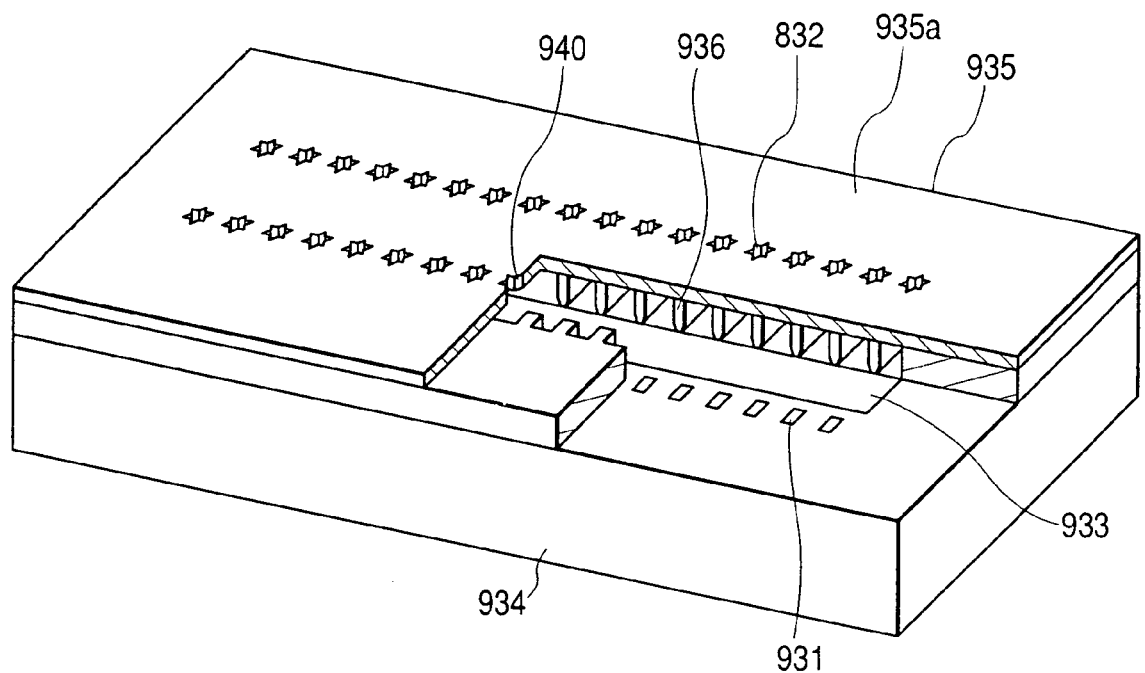
FIG. 15 is a schematic perspective view typically illustrating the main portion of an exemplary ink jet head used in the ink-jet cartridge shown in FIG. 14.

FIG. 15 is a schematic perspective view typically illustrating principal parts of a liquid-ejecting head suitable for use in the ink-jet recording apparatus of the present invention, and FIGS. 16 to 19 are front views illustrating the form of ejection openings of the liquid-ejecting head shown in FIG. 15. Incidentally, in these drawings, electrical wiring and the like for driving electrothermal conversion elements are omitted.

In the liquid-ejecting head according to this embodiment, such a substrate 934 composed of glass, ceramic, plastic or metal as illustrated in, for example, FIG. 15 is used. The material of such a substrate is not essential to the present invention and is not particularly limited so far as it functions as a part of a flow-path forming member and as a support for an ink ejection-energy-generating element, and a material layer for forming a liquid flow path and ejection openings, which will be described subsequently. Therefore, in this embodiment, the description is given in the case where an Si substrate (wafer) is used. The ejection openings can be formed on such a substrate 934. Processes therefor include a forming process by laser beam, and a process in which for example, a photosensitive resin is used as an orifice plate (ejection-opening plate) 935, which will be described subsequently, to form ejection openings by an exposure apparatus such as MPA (mirror projection aligner).

In FIG. 15, reference numeral 934 indicates a substrate equipped with electrothermal conversion elements (hereinafter may be referred to as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along the longitudinal direction thereof with an interval of, for example, 300 dpi between the electrothermal conversion elements. Walls 936 for ink flow path for forming ink flow paths are provided on the substrate 934. Further, an ejection-opening plate 935 equipped with ejection openings 832 is provided on the walls 936 for ink flow path.

In FIG. 15, the walls 936 for ink flow path and the ejection-opening plate 935 are illustrated as separate members. However, the walls 936 for ink flow path may be formed on the substrate 934 by a method such as spin coating, thereby forming the walls 936 for ink flow path and the ejection-opening plate 935 as the same member at the same time. In this embodiment, the side of the ejection-opening face (upper surface) 935a is subjected to a water-repellent treatment.

In the apparatus illustrated, a head of the serial type that recording is conducted with scanning in the direction shown by the arrow S in FIG. 13 is used to conduct recording at, for example, 1,200 dpi. Driving frequency is 10 kHz, and ejection is conducted at the shortest time interval of 100 μs in one ejection opening.

Figure 16:
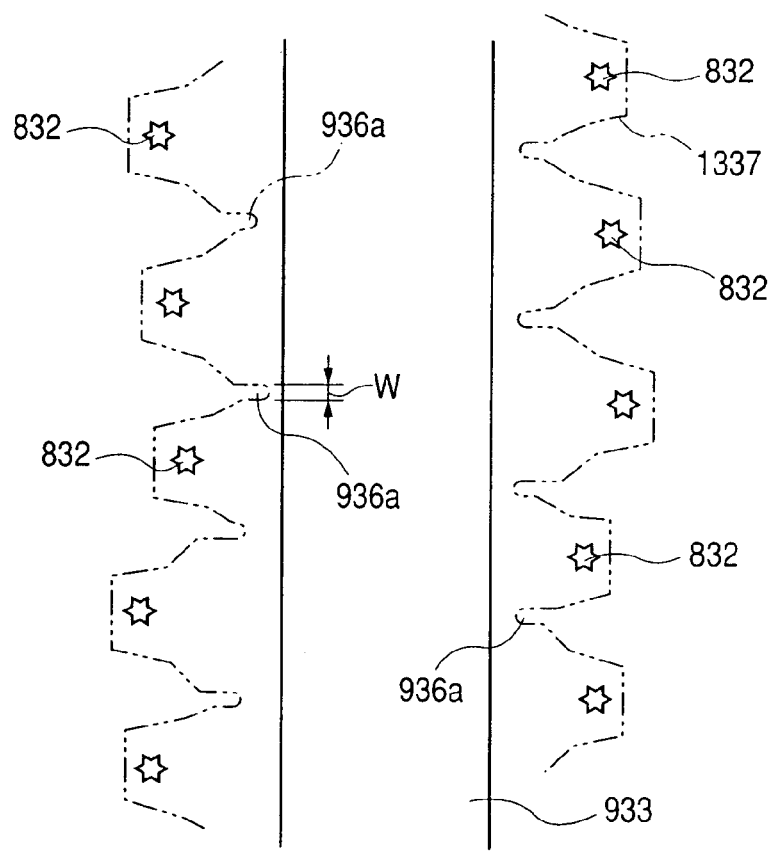
FIG. 16 is a conceptual view of a part of the exemplary ink ejection head shown in FIG. 14.
Figure 19:
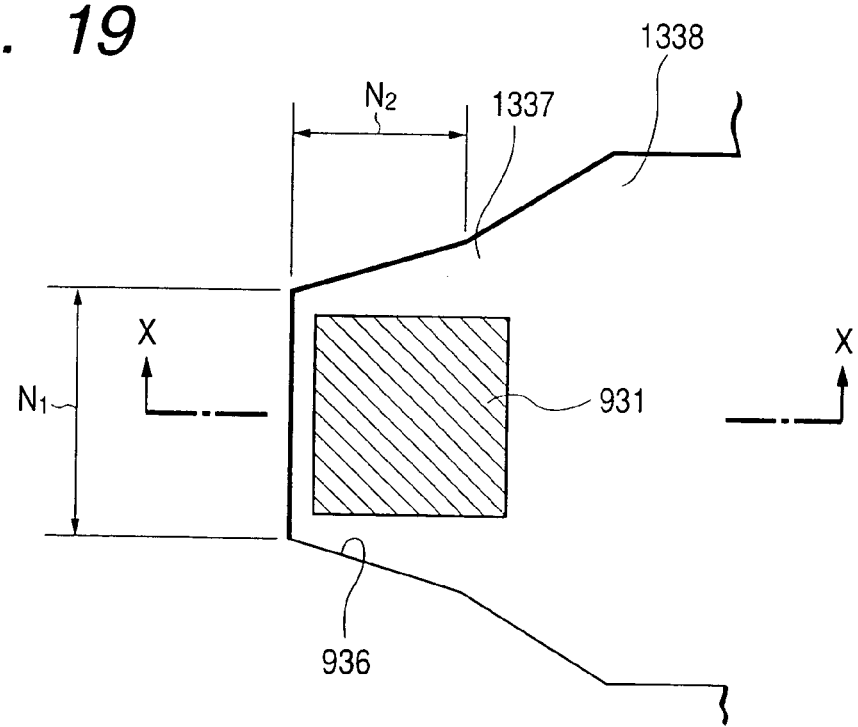
FIG. 19 is a schematic view of the main part of the head of FIG. 16.

As an example of dimensions of the head, a partition wall 936*a* for isolating adjacent nozzles from each other from the viewpoint of fluid has a width w of 14 μm as illustrated in, for example, FIG. 16. As illustrated in FIG. 19, a bubbling chamber 1337 formed with the walls 936 for ink flow path has $N_1$ (width of the bubbling chamber) of 33 μm and $N_2$ (length of the bubbling chamber) of 35 μm. The size of the heater 931 is 30 μm×30 μm, the resistance value of the heater is 53 Ω, and the driving voltage is 10.3 V. A head in which the heights of the wall 936 for ink flow path and the partition wall 936*a* are 12 μm, and the thickness of the ejection-opening plate is 11 μm may be used.

Figure 17:
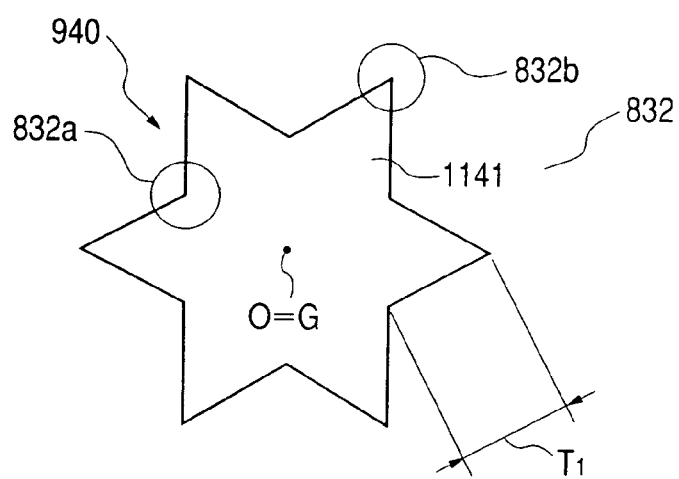
FIG. 17 is an enlarged view illustrating one of the ejection openings shown in FIG. 16.

In the section of an ejection opening part 940 provided in the ejection-opening plate including ejection openings 832, the form of a section taken along a direction intersecting the ejecting direction (thickness-wise direction of the orifice plate 935) of the ink is a substantially star form as illustrated in FIG. 17 and is generally formed from 6 projected portions 832*a* having a corner of an obtuse angle and 6 recessed portions 832*b* alternately arranged between these projected portions 832*a* and having a corner of an acute angle. More specifically, 6 grooves (with respect to the position of the groove portion, see 1141*a* in FIG. 20) are formed in the thickness-wise direction (ejecting direction of the liquid) of the orifice plate shown in FIG. 15 by forming the recessed portions 832*b* locally distant from the center O of the ejection opening as a top thereof and the projected portions 832*a* adjacent to the recessed portions 832*b* and locally near from the center O of the ejection opening as a base.

In the liquid-ejecting head illustrated, the ejection opening part 940 is such that, for example, a section taken along a direction intersecting the thickness-wise direction thereof is in a form with 2 equilateral triangles having a side of 27 μm combined with each other in a state that one of them has been turned by 60 degrees relative to the other. $T_1$ shown in FIG. 17 is 8 μm. The angles of the projected portions 832*a* are all 120 degrees, while the angles of the recessed portions 832*b* are all 60 degrees.

Accordingly, the center O of the ejection opening coincides with the center of gravity G of the polygon formed by connecting the centers (the center (center of gravity) of each figure formed by connecting the top of the groove and the 2 bases adjacent to the top) of the grooves adjacent to each other (see FIG. 17). The opening area of the ejection opening 832 in this embodiment is 400 μm², and the opening area of each groove (the area of each figure formed by connecting the top of the groove and the 2 bases adjacent to the top) is about 33 μm².

Figure 18:
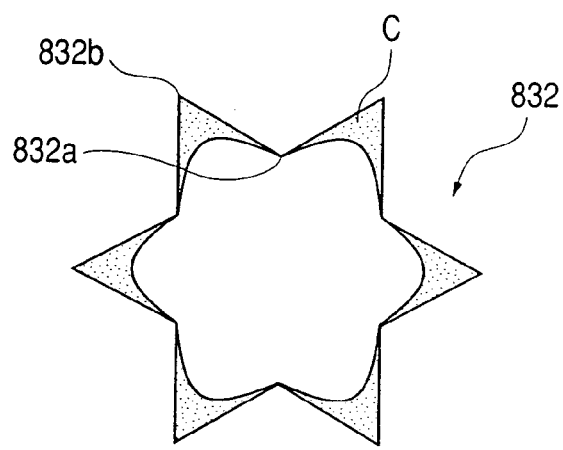
FIG. 18 schematically illustrates residual ink in the ejection opening shown in FIG. 17.

FIG. 18 is a typical drawing illustrating a state that an ink has adhered to the ejection opening portion shown in FIG. 17. In FIG. 18, reference character C indicates a part to which the ink has adhered.

An ejecting operation of a liquid by the ink-jet recording head of the above-described construction will hereinafter be described with reference to FIGS. 20 to 27.

FIGS. 20 to 27 are cross-sectional views for illustrating the ejecting operation of a liquid by the liquid-ejecting head shown in FIGS. 15 to 19 and are cross-sectional views of the bubbling chamber 1337 shown in FIG. 19 taken along line X—X. In this section, an end of the ejection opening part 940 in the thickness-wise direction of the orifice plate is the top 1141*a* of a groove 1141.

Figure 20:
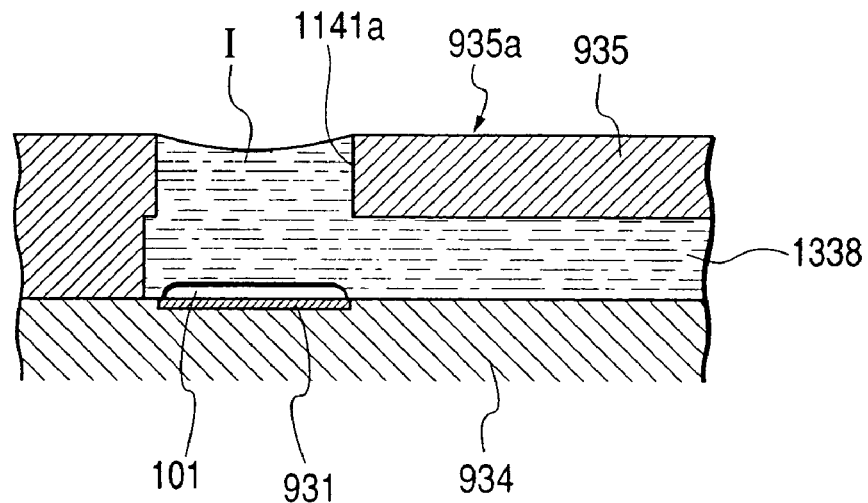
FIGS. 20, 21, 22, 23, 24, 25, 26 and 27 are schematic sectional views of the ink ejection head taken along X—X in FIG. 19, illustrating the liquid ejection process of the liquid ejection head with time.

FIG. 20 illustrates a state that a film-like bubble has been formed on the heater, and FIGS. 21, 22, 23, 24, 25, 26 and 27 illustrate states after about 1 μs from the state in FIG. 20, after about 2 μs from the state in FIG. 20, after about 3 μs from the state in FIG. 20, after about 4 μs from the state in FIG. 20, after about 5 μs from the state in FIG. 20, after about 6 μs from the state in FIG. 20 and after about 7 μs from the state in FIG. 20, respectively. Incidentally, in the following description, "drop" or "drop-in" does not mean drop in the so-called gravity direction, but means the movement in the direction of an electrothermal conversion element irrespective of the installing direction of a head.

Figure 21:
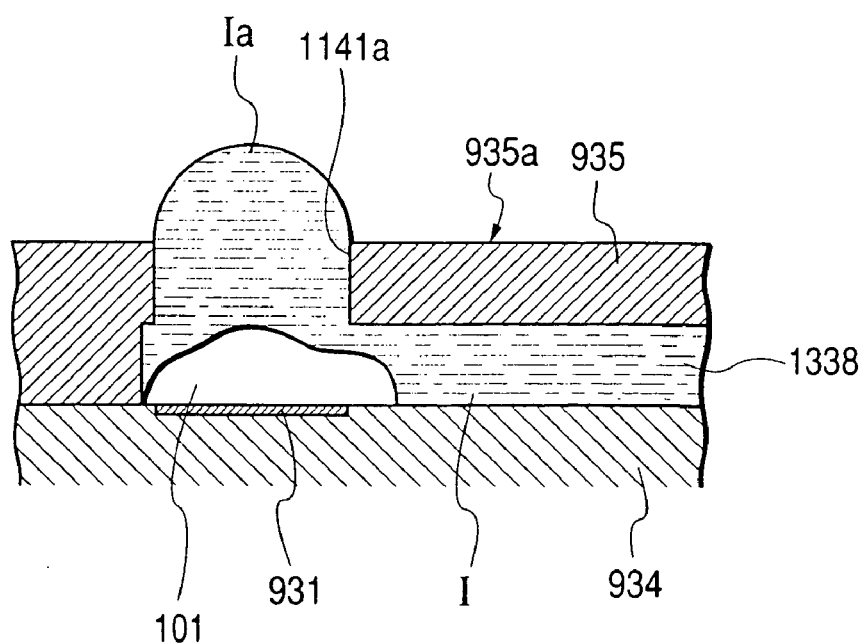
Figure 22:
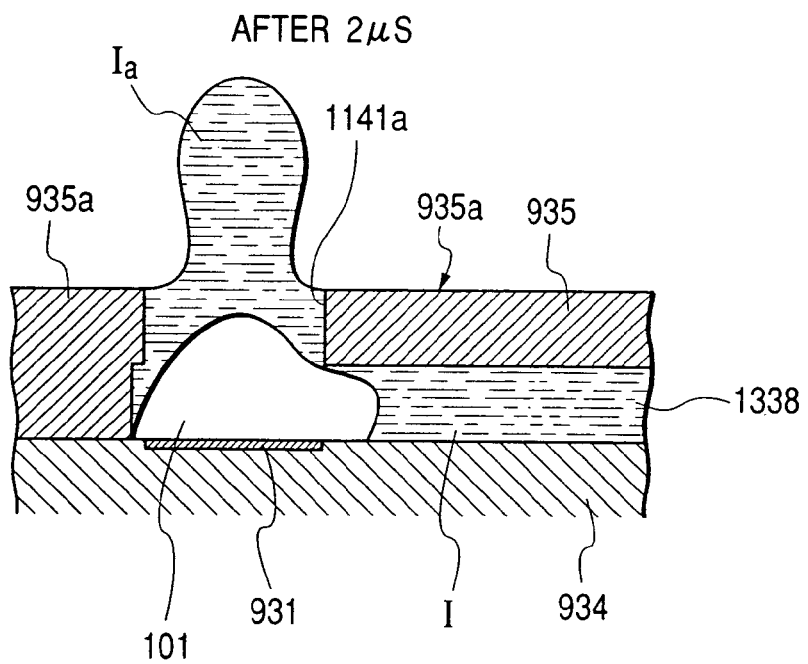

When a bubble 101 is first formed in a liquid flow path 1338 on a heater 931 by energizing the heater 931 on the basis of a recording signal or the like as illustrated in FIG. 20, the bubble quickly volumetrically expands and grows during about 2 μs as illustrated in FIGS. 21 and 22. The height of the bubble 101 in the greatest volume exceeds the face 935*a* of an ejection opening. At this time, the pressure of the bubble decreases from one to several to one to several tens as high as the atmospheric pressure.

Figure 23:
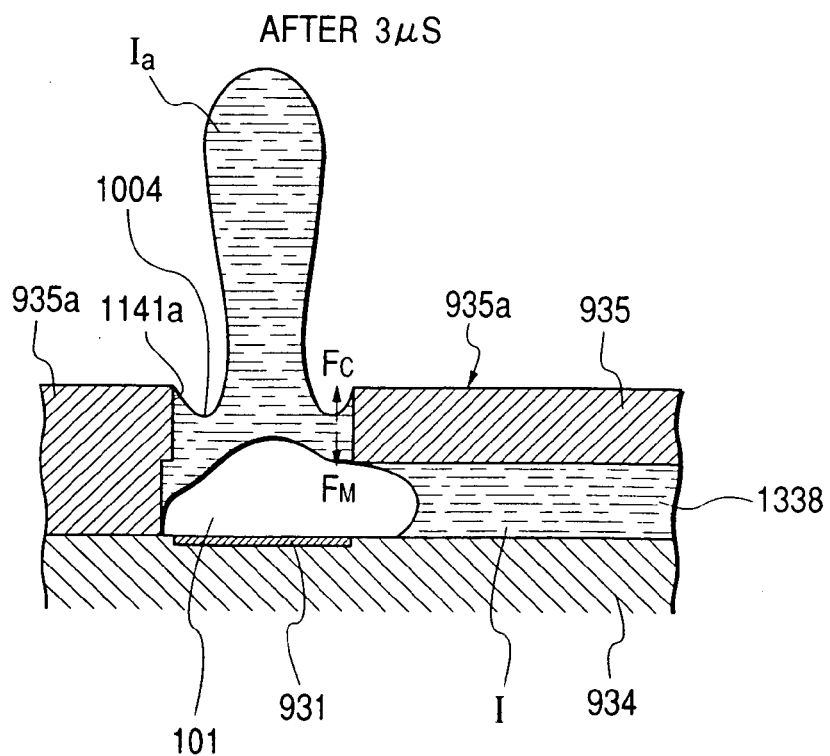

At the time about 2 μs have elapsed from the formation of the bubble, the volume of the bubble 101 turns from the greatest volume to decreased volume as described above, and at substantially the same time as this, the formation of a meniscus 1004 is started. The meniscus 1004 also recedes, i.e., drops in the direction of the heater 931 as illustrated in FIG. 23.

In this embodiment, the ejection opening part in the liquid-ejecting head illustrated has a plurality of grooves 1141 in a dispersed state, whereby capillary force acts in an opposite direction FC to the receding direction FM of the meniscus at the portion of the groove 1141 when the meniscus 1004 recedes. As a result, the forms of the meniscus and a main droplet (hereinafter may be referred to as "liquid" or "ink" in some cases) $I_a$ when the meniscus recedes are compensated so as to give substantially symmetrical forms to the center of the ejection opening even if some variation is observed in the state of the bubble 101 by some cause.

Figure 24:
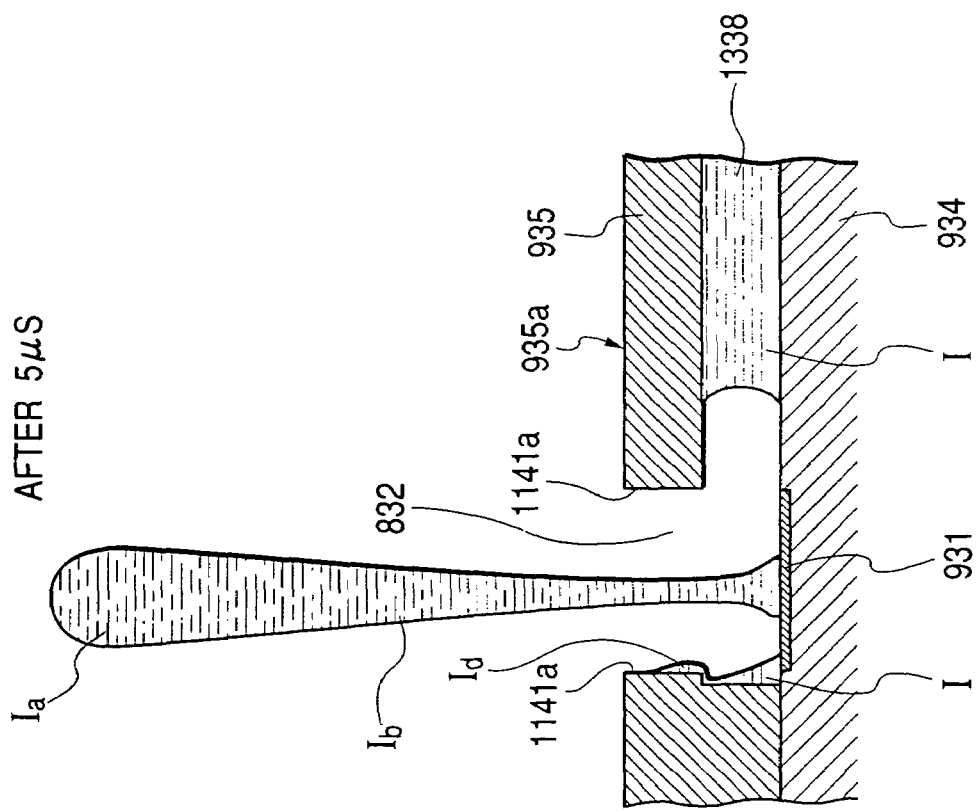

In the liquid-ejecting head illustrated, the dropping velocity of this meniscus 1004 is faster than the contracting velocity of the bubble 101, so that the bubble 101 communicates with the atmosphere in the vicinity of the lower surface of the ejection opening 832 at the time about 4 μs have elapsed from the formation of the bubble as illustrated in FIG. 24. At this time, the liquid (ink) in the vicinity of the central axis of the ejection opening 832 drops toward the heater 931 because the liquid (ink) $I_a$ pulled back on the side of the heater 931 by the negative pressure of the bubble 101 before the communication with the atmosphere retains the velocity in the direction toward the heater 931 by virtue of inertia even after the communication with the atmosphere.

Figure 25:
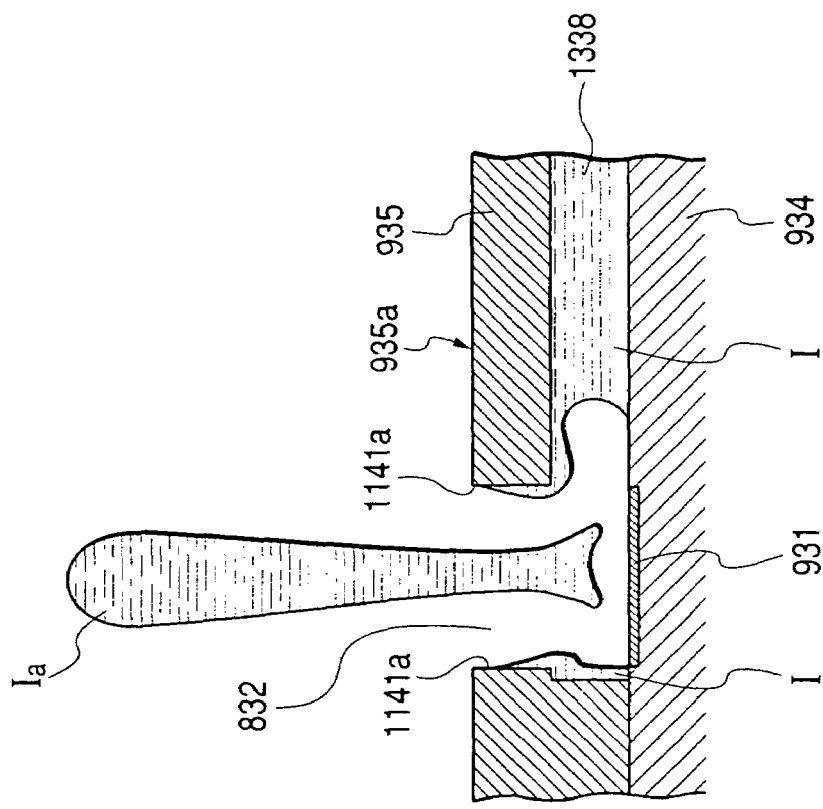
Figure 26:
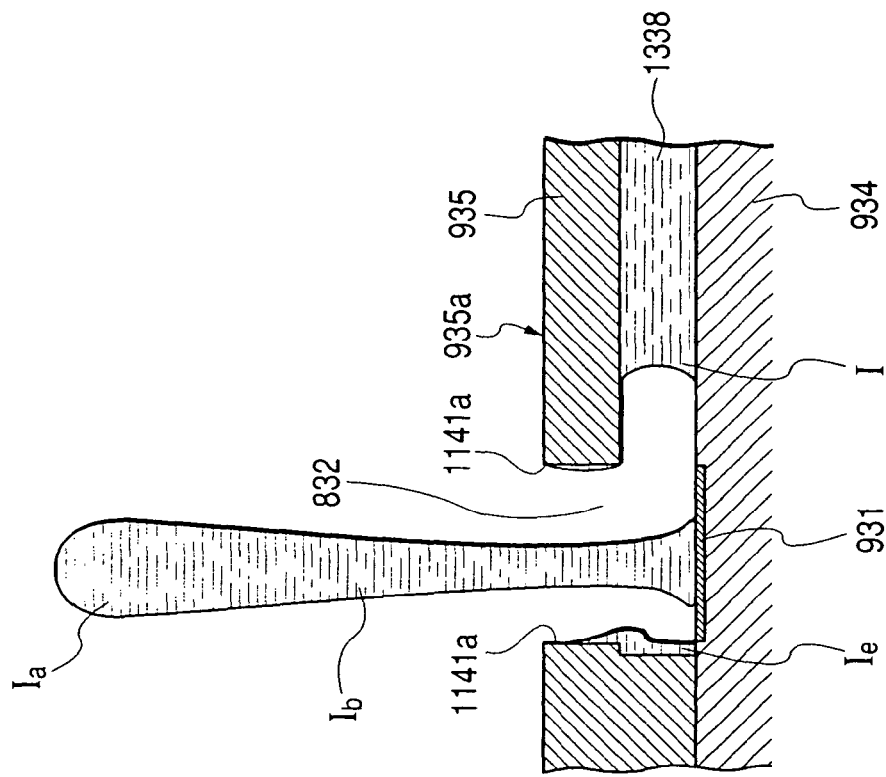

The liquid (ink) dropped toward the side of the heater 931 reaches the surface of the heater 931 at the time about 5 μs have elapsed from the formation of the bubble 101 as illustrated in FIG. 25, and spreads so as to cover the surface of the heater 931 as illustrated in FIG. 26. The liquid spread so as to cover the surface of the heater 931 as described above has a vector in a horizontal direction along the surface of the heater 931. However, a vector in a direction intersecting the surface of the heater 931, for example, perpendicular direction vanishes, so that the liquid intends to remain on the surface of the heater 931, thereby pulling a liquid located above such a liquid, i.e., a liquid keeping a velocity vector in the ejecting direction, downward.

Figure 27:
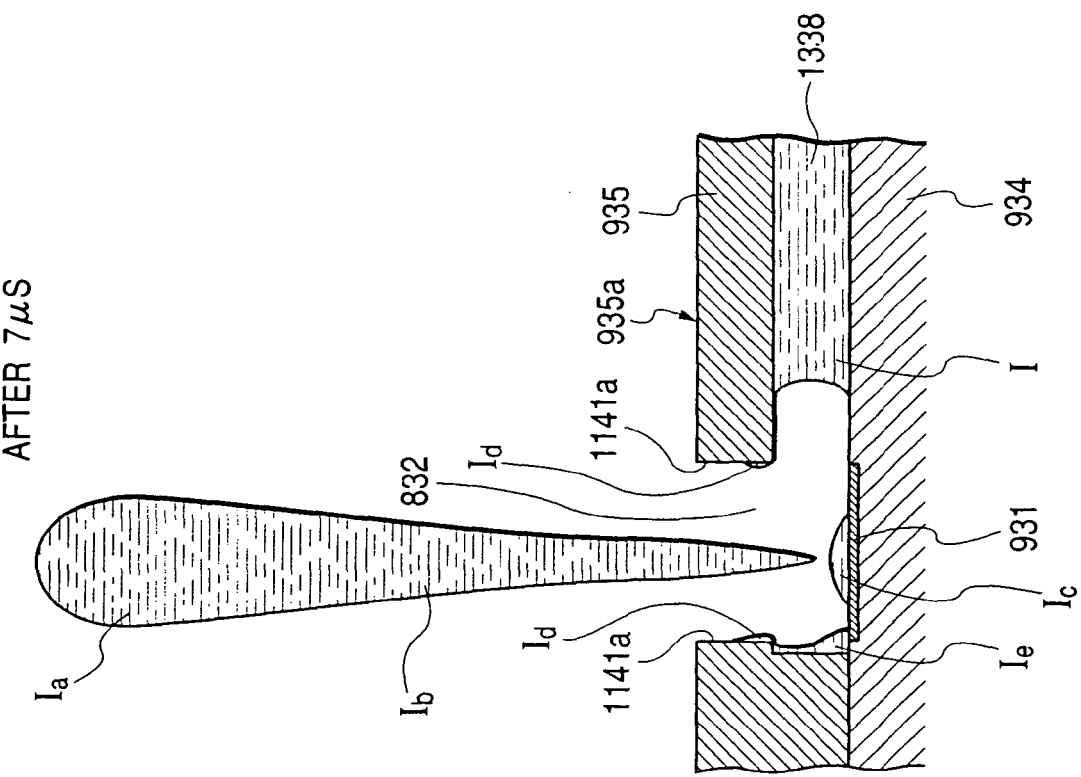

Thereafter, a liquid portion $I_b$ between the liquid spread on the surface of the heater 931 and the liquid located thereabove (main droplet) becomes thin, and is broken in the center of the surface of the heater 931 at the time about 7 μs have elapsed from the formation of the bubble as illustrated in FIG. 27, whereby the liquid is separated into a main droplet $I_a$ keeping a velocity vector in the ejecting direction and a liquid $I_c$ spread on the surface of the heater 931. The position of such separation is desirably the interior of the liquid flow path 1338, preferably a side closer to the electrothermal conversion element 931 than the ejection opening 832.

The main droplet $I_a$ is ejected from the central portion of the ejection opening 832 without deviation in the ejecting direction and ejection slippage and impacted at the prescribed position of a recording surface on a recording medium. The liquid $I_c$ spread on the surface of the heater 931 is ejected as a satellite droplet following the main droplet up to now. However, it remains on the surface of the heater 931 without being ejected.

Since the ejection of the satellite droplet can be prevented as described above, splash easily occurring by the ejection of the satellite droplet can be prevented, and staining of the recording surface on the recording medium with mist from the ink can be surely prevented. In FIGS. 24 to 27, reference characters $I_d$ and $I_e$ indicate an ink attached to the groove portion (ink within the groove) and an ink remaining in the liquid flow path, respectively.

As described above, in the liquid-ejecting head illustrated, the direction of the main droplet upon ejection can be stabilized by the plural grooves dispersed relative to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, in the liquid-ejecting head illustrated, the liquid is ejected by communicating the bubble with the atmosphere for the first time at the stage that the volume of the bubble decreases, whereby mist occurring upon the ejection of the droplet by communicating the bubble with the atmosphere can be prevented, so that the state that droplets adhere to the ejection opening face, which forms the main cause of the so-called sudden ejection failure, can also be inhibited.

As another embodiment of the recording head of the ejection system that a bubble is communicated with the atmosphere upon ejection, there may be mentioned the so-called edge shooter type as described in, for example, Japanese Patent Registration No. 2783647.

In particular, the present invention has excellent effects in recording heads and recording apparatus of an ink-jet system that thermal energy is utilized to form a flying droplet to be ejected, thereby conducting recording, among the ink-jet recording systems.

With respect to the typical construction and principle thereof, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to recording information and gives a rapid temperature rise exceeding film boiling is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124, which is an invention relating to the rate of temperature rise of the heat-acting surfaces, are adopted, far excellent recording can be conducted.

As the construction of the recording head which makes up the ink-jet recording apparatus to be used in the present invention, such combined constructions (linear liquid flow path or perpendicular liquid flow path) of ejection openings, a liquid flow path and electrothermal converters as disclosed in the above-described U.S. specifications, and besides constructions based on U.S. Pat. Nos. 4,558,333 and 4,459,600 which disclose the construction that a heat-acting portion is arranged in a curved region may also be preferably used.

In addition, constructions based on Japanese Patent Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening absorbing pressure wave of thermal energy is provided in opposition to an ejection part may also be effective for the present invention.

Further, as a full-line type recording head having a length corresponding to the longest width of recording media, on which a recording apparatus can record, both construction that the length is met by such a combination of plural recording heads as disclosed in the above-described specifications and construction as one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means for a recording head, preliminary auxiliary means, etc. which are provided to the constitution of the recording apparatus to be used for the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

As a recording mode of the recording apparatus, the present invention is extremely effective for not only recording mode using main colors such as black, but also apparatus equipped with at least one of complex color of different colors and full color by color mixing by integrally constructing a recording head or combining plural recording heads with each other.

In the above-described embodiments of the present invention, the inks have been described as liquid. However, inks solidified at room temperature or lower may also be used so far as they are softened or liquid at room temperature, or exhibit a liquid phase upon application of recording signals used because it is general in the above-described ink-jet systems that the temperature control of an ink itself is conducted within a range of from 30 to 70° C. to adjust the viscosity of the ink so as to fall within a stable ejection range.

In addition, inks that are liquefied by applying thermal energy according to recording signals and ejected as liquid inks, such as inks in which temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposite electrothermal converters in a state retained as a liquid or solid in recesses or through-holes in a porous sheet as described in Japanese Patent Application Laid-Open No. 54-56847 or 60-71260. In the present invention, the above-described film boiling system is most effective for the above-described inks.

Furthermore, as forms of the recording apparatus according to the present invention, forms wherein the apparatus is integrally or separately provided as an image output terminal for information processing instruments such as word processors and computers, and forms such as copying machines combined with a reader and facsimiles having a transmitting-receiving function may also be adopted.

The outline of a liquid-ejecting apparatus in which the above-described liquid-ejecting head is installed will hereinafter be described.

Figure 28:
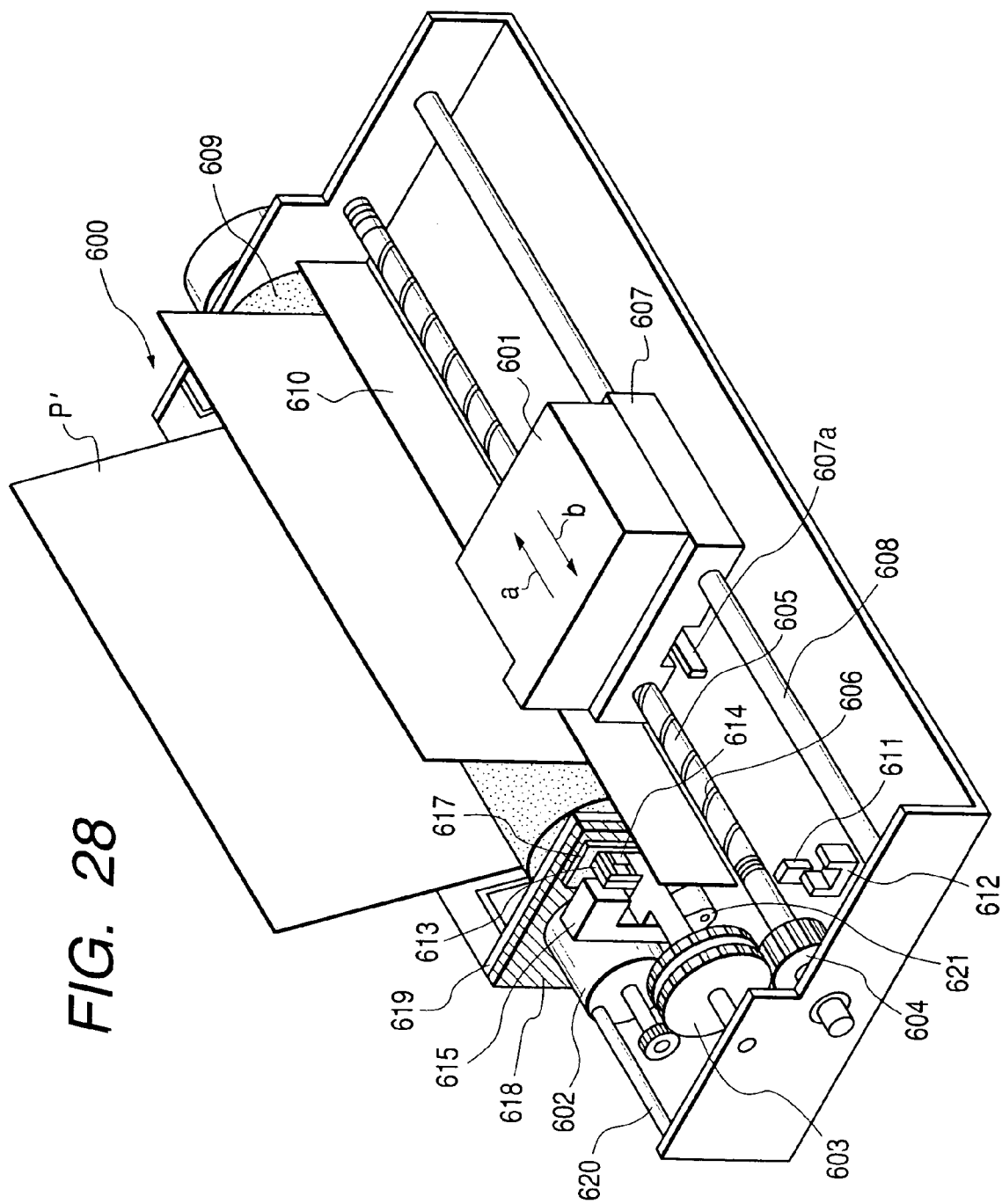
FIG. 28 is a schematic perspective view of an ink-jet recording apparatus 600 which is an example of a liquid-ejecting apparatus to which the ink-jet recording method according to the present invention can be applied.

FIG. 28 is a schematic perspective view of an ink-jet recording apparatus 600 which is an example of a liquid-ejecting apparatus to which the liquid-ejecting head described above can be installed and applied. In FIG. 28, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 of a leadscrew 605 rotating through driving force-transmitting gears 603 and 604 interlocking with the forward and reverse rotations of a driving motor 602 and reciprocatingly moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611 and 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink stored in the interior of the cap member 614 by dummy ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body and not illustrated here.

The ink-jet recording apparatus 600 having the above-described construction conducts recording on the recording medium P' conveyed on the platen roller 609 by the recording medium-conveying means (not illustrated) while reciprocatingly moving the ink-jet head cartridge 601 over the full width of the recording medium P'.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLES 1 TO 8, AND COMPARATIVE EXAMPLES 1 TO 8

The respective components shown in Table 1 were mixed and thoroughly stirred into solutions or dispersions. The resultant solutions or dispersions were separately filtered under pressure through a Fluoropore Filter (trade name; product of Sumitomo Electric Industries, Ltd.) having a pore size of 0.1 μm, thereby preparing inks Nos. 1–8 to be used in Examples and Comparative Examples.

TABLE 1

COMPOSITION OF COMPONENTS IN INK USED IN EXAMPLES and COMPARATIVE EXAMPLES

| | | Ink No. | | | | | | | |
|---|---|---|---|---|---|---|---|---|---|
| | | 1 | 2 | 3 | 4 | 5 | 6 | 7 | 8 |
| Fluorescent compound (coloring material) | C.I. Acid Red 52 | 0.2 | 0.3 | 0.3 | 0.2 | 0.3 | 0.25 | 0.4 | 0.25 |
| | C.I. Acid Red 92 | | | | | 0.5 | | | |
| | C.I. Solvent Yellow 7 | | | | | 0.1 | | | |
| Non-fluorescent coloring material | Exemplified coloring material(11) | | 0.4 | | | | 0.2 | | 0.5 |
| | Exemplified coloring material(2) | | | | 0.25 | | | | |
| | C.I. Direct Red 80 | 0.01 | | | | | | | 0.01 |

TABLE 1-continued

COMPOSITION OF COMPONENTS IN INK USED IN EXAMPLES and COMPARATIVE EXAMPLES

|  |  | Ink No. | | | | | | | |
|---|---|---|---|---|---|---|---|---|---|
|  |  | 1 | 2 | 3 | 4 | 5 | 6 | 7 | 8 |
| Surfactant | Sarfinol 440(HLB = 8) |  |  | 0.1 |  |  |  |  |  |
|  | Sarfinol 465(HLB = 13) | 2 | 1 | 1.5 | 1 | 1 | 2 |  | 1.5 |
|  | Exemplified compound(V) |  |  |  | 1 |  |  | 1.1 |  |
| Incompatible compound | Glycerin | 10 | 10 | 8 |  |  | 10 | 10 | 8 |
|  | Glycerin (dimer) |  |  |  | 5 |  | 5 |  |  |
|  | Xylitol |  |  |  |  | 5 |  |  |  |
| Organic Solvent | Triethylene glycol | 10 |  | 8 | 10 | 10 |  |  | 8 |
|  | Tripropylene glycol |  |  |  | 5 |  |  |  |  |
| Others | Urea |  |  | 8 |  | 5 |  |  | 8 |
|  | Triethanolamine |  |  |  |  | 3 |  |  |  |
|  | Isopropyl alcohol |  |  | 4 | 4 | 3 |  |  | 4 |
|  | pure water | balance | balance | balance | balance | balance | balance | balance | balance |

<Evaluation>

The resultant inks Nos. 1–8 having the corresponding compositions shown in Table 1 were used to evaluate the inks by mounting each of them in a commercially available ink-jet printer BJC 440J (Trade name, manufactured by Canon Inc.), outputting images then evaluating the obtained images in accordance with the following respective procedures and standards. In this regard, Examples 1–8 correspond to the use of ink-cartridges comprising a polypropylene based ink container with an ink-holding member made of polypropylene (polyolefin) fiber aggregate, while Comparative Examples 1–8 correspond to the use of ink-cartridges comprising a polypropylene based ink container with an ink-holding member made of polyurethane foam. The results are shown in Table 2.

1. Evaluation of Ejection Stability

Each of the resultant inks Nos. 1–8 having the corresponding compositions shown in Table 1 was charged into an ink tank containing the respective ink-holding member made of the above described materials within BJC 400J in a predetermined amount to record alphanumeric characters on commercially available wood-free paper until the ink of the ink tank became exhausted. After recording, recorded matters obtained at the first and last times of recording were compared with each other to visually evaluate the ink in accordance with the following standard:
A: No difference was observed between both recorded matters;
B: Slight decrease of print quality level was observed in the last recorded matter;
C: Significant decrease of print quality level was observed in the last recorded matter compared with the first one and ejection failure was also observed.

2. Evaluation of Shelf Life (1)

Each of the resultant inks Nos. 1–8 having the corresponding compositions shown in Table 1 was placed in an ink cartridge and left to stand for 3 months at 60° C. Thereafter, a solid image was printed at Duty 50% onto commercially available wood-free paper under the condition of 23° C., 50% RH. Then, by means of FP-750 (Trade name, manufactured by Nippon Keiko K.K.) as a fluorescence intensity measuring device, both of the fluorescence intensity of coloring materials contained in the inks Nos. 1–8 and the obtained images were measured under the most easy measurement conditions of excitation wavelength 260 nm and emission wavelength 600 nm to evaluate the results in accordance with the following standard:
A: Fluorescence intensity $\geq$ 350;
B: 350>fluorescence intensity $\geq$ 300;
C: 300>fluorescence intensity.

3. Evaluation of Shelf Life (2)

Each of the resultant inks Nos. 1–8 having the corresponding compositions shown in Table 1 was placed and sealed in a glass container and left to stand for 1 month at 60° C. Thereafter, further leaving for 1 day at room temperature, the ink was visually observed to evaluate the preservation ability thereof in accordance with the following standard. This evaluation was to determine the shelf life of inks themselves, but was added to the items of evaluation in the examples.
A: None of precipitate, suspended matter and separation of ink components were observed;
B: Precipitate or suspended matter was slightly observed;
C: Separation was observed at a gas-liquid interface of the ink;
D: Precipitate was observed to a great extent.

4. Evaluation of Coloring Ability

Each of the resultant inks Nos. 1–8 having the corresponding compositions shown in Table 1 was placed in a respective ink-cartridge as described above. Then, alphanumerics and a mono-color image were recorded on commercially available wood-free paper to visually observe the resultant recorded matters in accordance with the following standard:
A: Bright or clear:
B: Not dull but not bright;
C: Dull.

5. Evaluation of Fluorescence Properties (1)

Each of the resultant inks Nos. 1–8 having the corresponding compositions shown in Table 1 was placed in a respective ink-cartridge as described above. Thereafter, a solid image was printed at Duty 50% onto commercially available wood-free paper under the condition of 23° C., 50% RH. Then, by means of FP-750 (Trade name, manufactured by Nippon Keiko K.K.) as a fluorescence intensity measuring device, both of the fluorescence intensity of coloring materials contained in the inks of Nos. 1–8 were measured under the most easy measurement condition of excitation wavelength 260 nm and emission wavelength 600 nm to evaluate the results in accordance with the following standard:
A: Fluorescence intensity >350;
B: 350>Fluorescence intensity>300;
C: 300>Fluorescence intensity.

6. Evaluation of Fluorescence Properties (2)

The same measurement as in Evaluation of fluorescence properties (1) was conducted in low-temperature and low-humidity environment of 15° C. and 10% RH to evaluate the inks in accordance with the same method and standard as described above. The results are shown in Table 2.

TABLE 2

| Evaluation items | Example(ink-holding member = polypropylene) | | | | | | | | Comparative example ink-holding member = polyurethane) | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| 1 | A | A | A | A | A | A | A | A | A | A | A | A | A | A | A | A |
| 2 | A | A | A | A | A | A | A | A | C | C | C | C | C | C | C | C |
| 3 | A | A | A | A | A | A | A | A | — | — | — | — | — | — | — | — |
| 4 | A | A | A | A | A | A | A | A | A | A | A | A | A | A | A | A |
| 5 | A | A | A | A | A | A | A | A | C | C | C | C | C | C | C | C |
| 6 | A | A | A | A | A | A | A | A | C | C | C | C | C | C | C | C |

As described above, there is provided an ink which can provide a recorded matter to the recorded portion of which, for example, fluorescence properties important for colors in nature are sufficiently imparted frilly making good use of the fluorescence properties of the ink and which has high fluorescence intensity and is excellent in print quality including coloring ability, said ink being capable of enhancing the reliability of the recorded matter including the preservation ability and the discharging ability, whereby a recording method and an ink-cartridge suitable for executing said method are provided to improve the stability and reliability of recorded matters.

What is claimed is:

1. A recording method comprising a step of providing an ink from a recording head to a recording medium through a gap provided between the recording head and the recording medium, the ink being supplied to the recording head from an ink tank comprising an ink contact member and the ink contacting the ink contact member,
    wherein the ink comprises:
    (i) a fluorescent coloring material;
    (ii) a nonionic surfactant;
    (iii) a compound which is not compatible with (ii); and
    (iv) a liquid medium for dissolving or dispersing (i), (ii) and (iii), and
    wherein the ink contact member is an ink-holding member made of polypropylene.

2. The method according to claim 1, wherein the ink-holding member is located in an ink container.

3. The method according to claim 2, wherein the ink-holding member has a surface in contact with the ink container.

4. The method according to claim 1, wherein the step comprises the sub-steps of:
    ejecting ink droplets from an orifice in response to recording signals using an ink-jet method, and
    conducting recording on the recording medium.

5. The method according to claim 4, wherein the sub-step for ejecting ink droplets is performed by applying thermal energy to the ink.

6. The method according to claim 1, wherein the fluorescent coloring material is water-soluble or hydrophilic.

7. The method according to claim 1, wherein the concentration of the fluorescent coloring material in the ink is equal to or exceeds the concentration thereof exhibiting the maximum fluorescence intensity.

8. The method according to claim 1, wherein the concentration of the fluorescent coloring material in the ink is not more than 1.5% by weight based on total weight of the ink.

9. The method according to claim 1, wherein the fluorescent coloring material is a fluorescent dye.

10. The method according to claim 1, wherein the nonionic surfactant is a liquid at room temperature.

11. The method according to claim 1, wherein the nonionic surfactant has an HLB of not more than 13.

12. The method according to claim 1, wherein the concentration of the nonionic surfactant in the ink is a value causing no phase separation in the ink.

13. The method according to claim 1, wherein the concentration of the nonionic surfactant in the ink is a value that does not cause phase separation of the nonionic surfactant even when the ink does not contain the fluorescent coloring material.

14. The method according to claim 1, wherein the concentration of the nonionic surfactant is contained in an amount not more than 1.0% by weight based on total weight of the ink.

15. The method according to claim 1, wherein the nonionic surfactant is water-soluble or hydrophilic.

16. The method according to claim 1, wherein the nonionic surfactant has an acetylene group.

17. The method according to claim 1, wherein the nonionic surfactant has a structure represented by the following formula I:

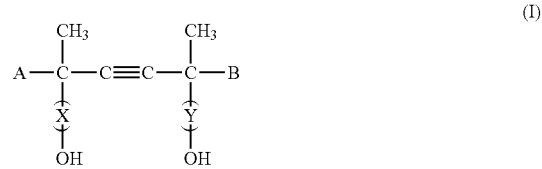

(wherein A and B are independently $C_nH_{2n+1}$ (n being an integer of 1 to 10), and X and Y are independently a ring-opened ethylene oxide unit and/or a ring-opened propylene oxide unit.).

18. The method according to claim 1 or 2, wherein (iii) is liquid at room temperature.

19. The method according to claim 1, wherein (iii) is water-soluble or hydrophilic.

20. The method according to claim 1, wherein (iii) is a compound selected from the group consisting of sugar alcohol, sugar alcohol complex and an ethyleneoxide and/or propyleneoxide adduct thereof.

21. The method according to claim 1 or 2, wherein the ink-holding member is formed of a fibrous aggregate.

22. The method according to claim 21, wherein the fibrous aggregate is arranged along a direction of discharging the ink.

23. The method according to claim 1, wherein the ink further comprises a primary alcohol.

24. The method according to claim 1, wherein the ink further comprises a non-fluorescent coloring material.

25. The method according to claim 24, wherein the non-fluorescent coloring material is water-soluble or hydrophilic.

26. The method according to claim 24, wherein the non-fluorescent coloring material is an azo dye.

27. The method according to claim 24, wherein a concentration of the non-fluorescent coloring material in the ink is not less than the concentration of the fluorescent coloring material.

28. The method according to claim 1, wherein the ink contains ammonium ions and alkali metal ions.

29. The method according to claim 1, wherein the ink further comprises at least one selected from urea and derivatives thereof.

30. The method according to claim 29, wherein the derivatives include alkyl derivatives of urea and ethyleneoxide adducts of urea and propyleneoxide adducts of urea.

31. The method according to claim 1, wherein the surface tension of the ink is not more than 40 mN/m (dyne/cm).

32. The method according to claim 1, wherein pH of the ink is not more than 8.

33. The recording method according to claim 1, wherein the fluorescent coloring material is C.I. Acid Red 52, and the content of the coloring material is at most 0.4% by weight based on total weight of the ink.

34. An ink-cartridge comprising an aqueous ink and an ink contact member,
wherein the ink comprises:
(i) a fluorescent coloring material;
(ii) a nonionic surfactant;
(iii) a compound which is not compatible with (ii); and
(iv) a liquid medium for dissolving or dispersing (i), (ii) and (iii), and
wherein the ink contact member is an ink-holding member made of polypropylene.

35. The ink-cartridge according to claim 34, wherein the ink contact member is at least one selected from an ink container containing the ink therein and an ink-holding member provided in the ink container together with the ink.

36. The ink-cartridge according to claim 35, wherein the ink-holding member is porous.

37. The ink-cartridge according to claim 35, wherein the ink-holding member has a surface in contact with the ink container.

38. The ink-cartridge according to claim 35, wherein the ink-holding member has a multi-layered structure.

39. The ink-cartridge according to claim 38, wherein layers constituting the multi-layered structure are arranged along a discharge direction of the ink in the ink container.

40. The ink-cartridge according to claim 38, wherein the ink-holding member has a surface in contact with the ink container.

41. The ink-cartridge according to claim 35, wherein the ink-holding member is made of a fibrous aggregate.

42. The ink-cartridge according to claim 41, wherein the fibrous aggregate is arranged along a discharge direction of the ink in the ink container.

43. The ink-cartridge according to claim 42, wherein the ink-holding member has a surface in contact with the ink container.

44. A printing apparatus comprising an ink-cartridge defined by claim 34 and an ink-jet head for discharging ink placed in the ink-cartridge.

45. An information recording apparatus comprising an ink-cartridge of claim 34 and an ink-jet head for discharging ink placed in the ink-cartridge.

46. The ink-cartridge according to claim 34, wherein the fluorescent coloring material is C.I. Acid Red 52, and the content of the coloring material is at most 0.4% by weight based on total weight of the ink.

47. An ink tank comprising an aqueous ink, an ink container and an ink-holding member,
wherein the ink comprises:
(i) a fluorescent coloring material;
(ii) a nonionic surfactant;
(iii) a compound which is not compatible with (ii); and
(iv) a liquid medium for dissolving or dispersing (i), (ii) and (iii), and
wherein the ink-holding member comprises polypropylene.

48. The ink-tank according to claim 47, wherein the fluorescent coloring material is C.I. Acid Red 52, and the content of the coloring material is at most 0.4% by weight based on total weight of the ink.

* * * * *

UNITED STATES PATENT AND TRADEMARK OFFICE
CERTIFICATE OF CORRECTION

| | |
|---|---|
| PATENT NO. | : 7,185,978 B2 |
| APPLICATION NO. | : 10/634825 |
| DATED | : March 6, 2007 |
| INVENTOR(S) | : Nagashima et al. |

It is certified that error appears in the above-identified patent and that said Letters Patent is hereby corrected as shown below:

<u>COLUMN 2</u>

Line 43, "comprises" should read --comprises:--.

<u>COLUMN 3</u>

Line 1, "still further" should read --a still further--.
Line 52, "time;" should read --time.--.

<u>COLUMN 10</u>

Line 35, "Fluorecent" should read --Fluorescent--.

<u>COLUMN 12</u>

Line 4, "Fluorecent" should read --Fluorescent--.

UNITED STATES PATENT AND TRADEMARK OFFICE
CERTIFICATE OF CORRECTION

PATENT NO.       : 7,185,978 B2
APPLICATION NO.  : 10/634825
DATED            : March 6, 2007
INVENTOR(S)      : Nagashima et al.

It is certified that error appears in the above-identified patent and that said Letters Patent is hereby corrected as shown below:

COLUMN 19

Lines 27-45, the chemical drawing shown beneath "Exemplified Coloring Material (4)" should be deleted and replaced with the following chemical drawing:

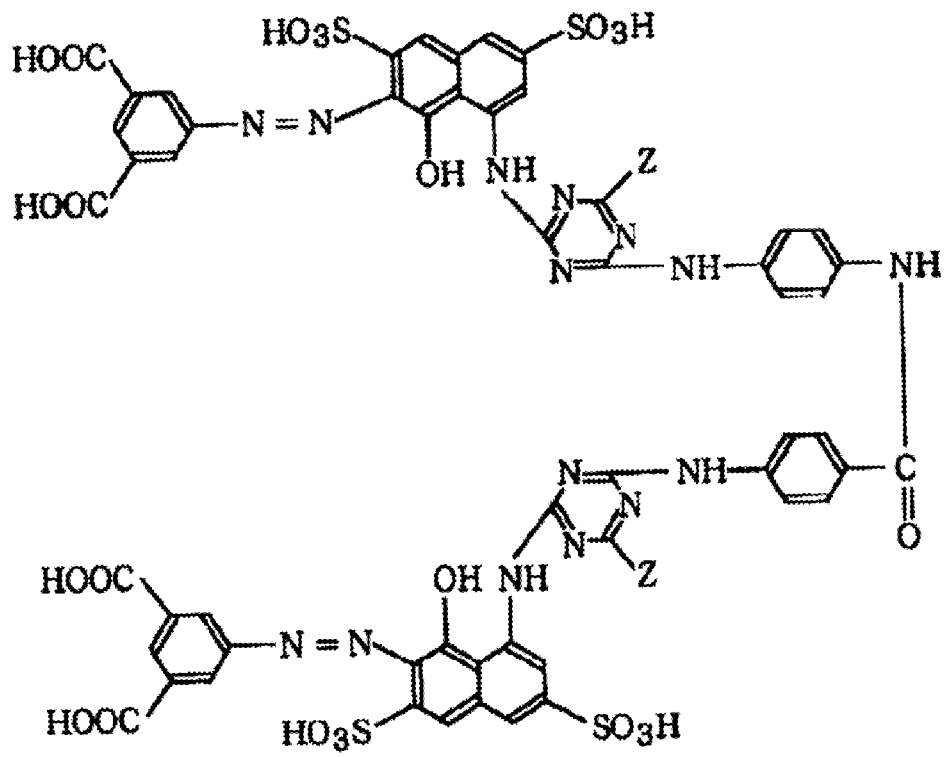

UNITED STATES PATENT AND TRADEMARK OFFICE
CERTIFICATE OF CORRECTION

PATENT NO.       : 7,185,978 B2
APPLICATION NO.  : 10/634825
DATED            : March 6, 2007
INVENTOR(S)      : Nagashima et al.

It is certified that error appears in the above-identified patent and that said Letters Patent is hereby corrected as shown below:

COLUMN 19

Lines 50-65, the chemical drawing shown beneath " Exemplified Coloring Material (5)" should be deleted and replaced with the following chemical drawing:

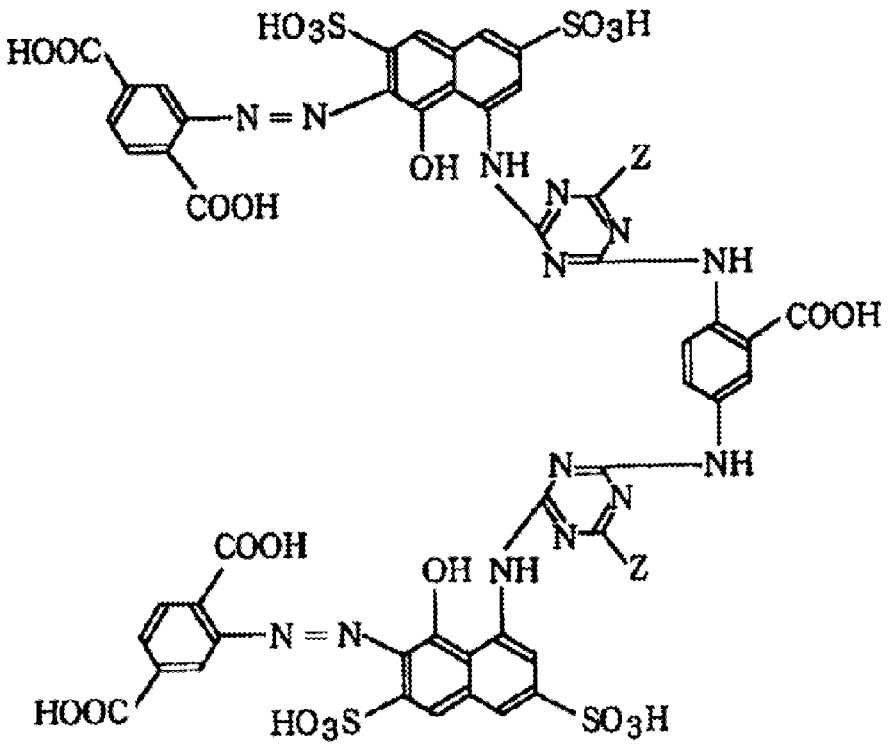

UNITED STATES PATENT AND TRADEMARK OFFICE
CERTIFICATE OF CORRECTION

PATENT NO. : 7,185,978 B2
APPLICATION NO. : 10/634825
DATED : March 6, 2007
INVENTOR(S) : Nagashima et al.

It is certified that error appears in the above-identified patent and that said Letters Patent is hereby corrected as shown below:

COLUMN 21

Line 7, "like))" should read --like)--.

COLUMN 37

In TABLE 2, "Example(ink-holding" should read --Example (ink-holding--.

Line 30, "frilly" should read --fully--.

Signed and Sealed this

Twentieth Day of May, 2008

JON W. DUDAS
*Director of the United States Patent and Trademark Office*